US012293695B2

(12) United States Patent
Oh et al.

(10) Patent No.: US 12,293,695 B2
(45) Date of Patent: May 6, 2025

(54) DRIVER AND DISPLAY DEVICE

(71) Applicant: Samsung Display Co., LTD., Yongin-si (KR)

(72) Inventors: Kyonghwan Oh, Yongin-si (KR); Taehoon Kwon, Yongin-si (KR); Mina Kim, Yongin-si (KR); Kyung-Hoon Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/403,346

(22) Filed: Jan. 3, 2024

(65) Prior Publication Data

US 2024/0386838 A1 Nov. 21, 2024

(30) Foreign Application Priority Data

May 16, 2023 (KR) ........................ 10-2023-0062886

(51) Int. Cl.
*G09G 3/20* (2006.01)

(52) U.S. Cl.
CPC ... *G09G 3/2096* (2013.01); *G09G 2300/0426* (2013.01); *G09G 2300/0819* (2013.01); *G09G 2300/0852* (2013.01); *G09G 2300/0861* (2013.01); *G09G 2310/0267* (2013.01); *G09G 2310/0291* (2013.01); *G09G 2310/08* (2013.01)

(58) Field of Classification Search
CPC ......... G09G 3/2096; G09G 2300/0426; G09G 2300/0819; G09G 2300/0852; G09G 2300/0861; G09G 2310/0267; G09G 2310/0291; G09G 2310/08
See application file for complete search history.

(56) References Cited

U.S. PATENT DOCUMENTS

| | | | |
|---|---|---|---|
| 9,305,509 | B2 | 4/2016 | Li et al. |
| 10,909,929 | B2 | 2/2021 | Yang et al. |

(Continued)

FOREIGN PATENT DOCUMENTS

| | | | |
|---|---|---|---|
| EP | 4123634 A1 | 1/2023 | |
| JP | 2000132975 A | 5/2000 | |

OTHER PUBLICATIONS

Partial European Search Report issued Aug. 1, 2024 in EP Application No. 24161087.2, 23 pages.

(Continued)

*Primary Examiner* — Sahlu Okebato
(74) *Attorney, Agent, or Firm* — CANTOR COLBURN LLP

(57) ABSTRACT

A driver is disposed in a display panel, and includes a plurality of stages. At least one stage of the plurality of stages includes an input circuit which transfers an input signal to a first node in response to at least one of a clock signal and an inverted clock signal, and inverters which generate an output signal based on a voltage of the first node. At least one of the inverters includes a p-type metal-oxide-semiconductor ("PMOS") transistor and an n-type metal-oxide-semiconductor ("NMOS") transistor connected in series between a line transferring a relatively high gate voltage and a line transferring a relatively low gate voltage. A first active region of the PMOS transistor includes a material different from a material of a second active region of the NMOS transistor.

35 Claims, 21 Drawing Sheets

(56) References Cited

U.S. PATENT DOCUMENTS

| | | | | |
|---|---|---|---|---|
| 11,328,642 | B2 | 5/2022 | Shang et al. | |
| 2018/0190204 | A1 | 7/2018 | Shin et al. | |
| 2020/0135132 | A1 | 4/2020 | Tanaka et al. | |
| 2021/0118375 | A1 | 4/2021 | Yang et al. | |
| 2021/0193683 | A1* | 6/2021 | Yang | G11C 5/06 |
| 2023/0268910 | A1* | 8/2023 | Lin | H03K 3/35625 327/202 |
| 2024/0161669 | A1 | 5/2024 | Lu et al. | |
| 2024/0221643 | A1* | 7/2024 | Li | G09G 3/3677 |

OTHER PUBLICATIONS

Extended European Search Report mailed Dec. 12, 2024 in EP Application No. 24161087.2, 27 pages.

* cited by examiner

DRIVER AND DISPLAY DEVICE

This application claims priority to Korean Patent Application No. 10-2023-0062886, filed on May 16, 2023, and all the benefits accruing therefrom under 35 U.S.C. § 119, the content of which in its entirety is herein incorporated by reference.

BACKGROUND

1. Field

Embodiments of the inventive concept relate to a display device, and more particularly to a driver formed in a display panel, and a display device including the driver.

2. Description of the Related Art

A driver (e.g., a gate driver and/or an emission driver) of a display device may sequentially provide signals (e.g., gate signals and/or emission signals) to pixels of a display panel on a row-by-row basis. To sequentially provide the signals on the row-by-row basis, the driver may be implemented in a form of a shift register including a plurality of stages.

In general, each stage of the driver may include only a single type of transistor, for example a p-type metal-oxide-semiconductor ("PMOS") transistor. In a case where each stage includes only the PMOS transistor, to output an output signal having a relatively low voltage level, a bootstrapping operation that decreases a voltage of an internal node of the stage to a voltage level lower than the relatively low voltage level should be performed.

SUMMARY

Some embodiments provide a driver in which each stage includes complementary metal-oxide-semiconductor ("CMOS") transistors.

Some embodiments provide a display device including a driver in which each stage includes CMOS transistors.

In an embodiment of the disclosure, there is provided a driver disposed in a display panel, and including a plurality of stages. At least one stage of the plurality of stages includes an input circuit which transfers an input signal to a first node in response to at least one of a clock signal and an inverted clock signal, and inverters which generates an output signal based on a voltage of the first node. At least one of the inverters includes a p-type metal-oxide-semiconductor ("PMOS") transistor and an n-type metal-oxide-semiconductor ("NMOS") transistor connected in series between a line transferring a relatively high gate voltage and a line transferring a relatively low gate voltage. A first active region of the PMOS transistor includes a material different from a material of a second active region of the NMOS transistor.

In embodiments, the first active region of the PMOS transistor may include polycrystalline silicon, and the second active region of the NMOS transistor may include an oxide semiconductor.

In embodiments, the first active region of the PMOS transistor may include polycrystalline silicon, and the second active region of the NMOS transistor may include an organic semiconductor.

In embodiments, the first active region of the PMOS transistor may include polycrystalline silicon, and the second active region of the NMOS transistor may include amorphous silicon.

In embodiments, the first active region of the PMOS transistor and the second active region of the NMOS transistor may be disposed in different layers disposed at different heights from a substrate of the display panel.

In embodiments, the NMOS transistor may include a top gate disposed above the second active region, and a bottom gate disposed below the second active region.

In embodiments, a second relatively low gate voltage different from the relatively low gate voltage may be applied to the bottom gate of the NMOS transistor.

In embodiments, the second relatively low gate voltage may be lower than the relatively low gate voltage.

In embodiments, the bottom gate of the NMOS transistor may be connected to the top gate of the NMOS transistor.

In embodiments, the input circuit may include a first PMOS transistor which transfers the input signal to the first node in response to the inverted clock signal.

In embodiments, the input circuit may include a first NMOS transistor which transfers the input signal to the first node in response to the clock signal.

In embodiments, the input circuit may include a first PMOS transistor which transfers the input signal to the first node in response to the inverted clock signal, and a first NMOS transistor which transfers the input signal to the first node in response to the clock signal.

In embodiments, the first PMOS transistor may include a gate receiving the inverted clock signal, a first terminal receiving the input signal, and a second terminal connected to the first node, and the first NMOS transistor may include a gate receiving the clock signal, a first terminal receiving the input signal, and a second terminal connected to the first node.

In embodiments, the at least one stage may further include a first capacitor which holds the voltage of the first node.

In embodiments, the first capacitor may include a first electrode connected to the line transferring the relatively high gate voltage, and a second electrode connected to the first node.

In embodiments, the inverters may include a first CMOS inverter which provides an inverted voltage to a second node by inverting the voltage of the first node, and a second CMOS inverter which generates the output signal by inverting a voltage of the second node.

In embodiments, the first CMOS inverter may include a second PMOS transistor including a gate connected to the first node, a first terminal connected to the line transferring the relatively high gate voltage, and a second terminal connected to the second node, and a second NMOS transistor including a gate connected to the first node, a first terminal connected to the line transferring the relatively low gate voltage, and a second terminal connected to the second node. The second CMOS inverter may include a third PMOS transistor including a gate connected to the second node, a first terminal connected to the line transferring the relatively high gate voltage, and a second terminal connected to an output node at which the output signal is output, and a third NMOS transistor including a gate connected to the second node, a first terminal connected to the line transferring the relatively low gate voltage, and a second terminal connected to the output node.

In embodiments, the at least one stage may further include a fourth PMOS transistor which transfers the relatively high gate voltage to the first node in response to a global reset signal.

In embodiments, the fourth PMOS transistor may include a gate receiving the global reset signal, a first terminal connected to the line transferring the relatively high gate voltage, and a second terminal connected to the first node.

In embodiments, the NMOS transistor may include a bottom gate. The at least one stage may further include a charge pump circuit which generates a bottom gate voltage applied to the bottom gate based on the relatively low gate voltage and the clock signal.

In embodiments, the charge pump circuit may include a fifth PMOS transistor including a gate connected to a third node, a first terminal connected to the bottom gate, and a second terminal connected to the third node, a sixth PMOS transistor including a gate connected to the line transferring the relatively low gate voltage, a first terminal connected to the third node, and a second terminal connected to the line transferring the relatively low gate voltage, a second capacitor including a first electrode connected to the third node, and a second electrode, and a seventh PMOS transistor including a gate connected to the third node, a first terminal connected to the second electrode of the second capacitor, and a second terminal receiving the clock signal.

In embodiments, the inverters may include a first CMOS inverter which provides an inverted voltage to a second node by inverting the voltage of the first node, and a second CMOS inverter which generates the output signal by inverting a voltage of the second node. The at least one stage may further include an eighth PMOS transistor including a gate connected to the first node, a first terminal connected to an output node at which the output signal is output, and a second terminal connected to the line transferring the relatively low gate voltage.

In embodiments, the inverters may include a first CMOS inverter which provides an inverted voltage to a second node by inverting the voltage of the first node, and a PMOS inverter which outputs the relatively high gate voltage as the output signal when a voltage of the second node has a relatively low level. The at least one stage may further include a PMOS boosting buffer which outputs the relatively low gate voltage as the output signal when the voltage of the first node has a relatively low level.

In embodiments, the PMOS boosting buffer may include a third capacitor including a first electrode connected to an output node at which the output signal is output, and a second electrode connected to a fourth node, a ninth PMOS transistor including a gate connected to the fourth node, a first terminal connected to the output node, and a second terminal connected to the line transferring the relatively low gate voltage, and a tenth PMOS transistor including a gate connected to the line transferring the relatively low gate voltage, a first terminal connected to the first node, and a second terminal connected to the fourth node.

In embodiments, the inverters may include a first CMOS inverter which provides an inverted voltage to a second node by inverting the voltage of the first node, and a second CMOS inverter which generates the output signal by inverting a voltage of the second node. The at least one stage may further include a PMOS boosting buffer which outputs the relatively low gate voltage as the output signal when the voltage of the first node has a relatively low level.

In embodiments, the inverters may include a first CMOS inverter which provides an inverted voltage to a second node by inverting the voltage of the first node, and a second CMOS inverter which generates the output signal by inverting a voltage of the second node. The at least one stage may further include a third CMOS inverter which generates a carry signal by inverting the voltage of the second node.

In embodiments, the third CMOS inverter may include an eleventh PMOS transistor including a gate connected to the second node, a first terminal connected to the line transferring the relatively high gate voltage, and a second terminal connected to a carry node at which the carry signal is output, and a fourth NMOS transistor including a gate connected to the second node, a first terminal connected to the line transferring the relatively low gate voltage, and a second terminal connected to the carry node.

In embodiments, the at least one stage may further include a PMOS boosting buffer which outputs the relatively low gate voltage as the output signal when the voltage of the first node has a relatively low level.

In embodiments, the PMOS boosting buffer may include a third capacitor including a first electrode connected to a carry node at which the carry signal is output, and a second electrode connected to a fourth node, a ninth PMOS transistor including a gate connected to the fourth node, a first terminal connected to an output node at which the output signal is output, and a second terminal connected to the line transferring the relatively low gate voltage, and a tenth PMOS transistor including a gate connected to the line transferring the relatively low gate voltage, a first terminal connected to the first node, and a second terminal connected to the fourth node.

In embodiments, the inverters may include a first CMOS inverter which provides an inverted voltage to a second node by inverting the voltage of the first node, and a PMOS inverter which outputs the relatively high gate voltage as the output signal when a voltage of the second node has a relatively low level. The at least one stage may further include a PMOS boosting buffer which outputs the relatively low gate voltage as the output signal when the voltage of the first node has a relatively low level, and a third CMOS inverter which generates a carry signal by inverting the voltage of the second node.

In an embodiment of the disclosure, there is provided a driver disposed in a display panel, and including a plurality of stages. At least one stage of the plurality of stages includes an input circuit which transfers an input signal to a first node in response to at least one of a clock signal and an inverted clock signal, and inverters which generate an output signal based on a voltage of the first node. At least one of the inverters includes a PMOS transistor and an NMOS transistor connected in series between a line transferring a relatively high gate voltage and a line transferring a relatively low gate voltage. The NMOS transistor includes a top gate disposed above an active region, and a bottom gate disposed below the active region.

In embodiments, a second relatively low gate voltage different from the relatively low gate voltage may be applied to the bottom gate of the NMOS transistor.

In embodiments, the bottom gate of the NMOS transistor may be connected to the top gate of the NMOS transistor.

In embodiments, an active region of the PMOS transistor may include a material different from a material of the active region of the NMOS transistor.

In an embodiment of the disclosure, there is provided a display device including a display panel including a plurality of pixels, a data driver which provides data signals to the plurality of pixels, a gate driver which provides gate signals to the plurality of pixels, an emission driver which provides emission signals to the plurality of pixels, and a controller which controls the data driver, the gate driver and the emission driver. At least one of the gate driver and the emission driver includes a plurality of stages. At least one stage of the plurality of stages includes an input circuit which transfers an input signal to a first node in response to at least one of a clock signal and an inverted clock signal, and inverters which generate an output signal corresponding to one of the gate signals or one of the emission signals based on a voltage of the first node. At least one of the inverters includes a PMOS transistor and an NMOS transistor connected in series between a line transferring a relatively high gate voltage and a line transferring a relatively low gate voltage. A first active region of the PMOS transistor includes a material different from a material of a second active region of the NMOS transistor.

As described above, in a driver and a display device in embodiments, at least one stage may include an input circuit and inverters. At least one of the inverters may include both of a PMOS transistor and an NMOS transistor, and an active region of the PMOS transistor may include a material different from a material of an active region of the NMOS transistor. Accordingly, a bootstrapping operation may not be desired in the stage, and power consumption of the driver and the display device may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION OF EMBODIMENTS

Figure 1:
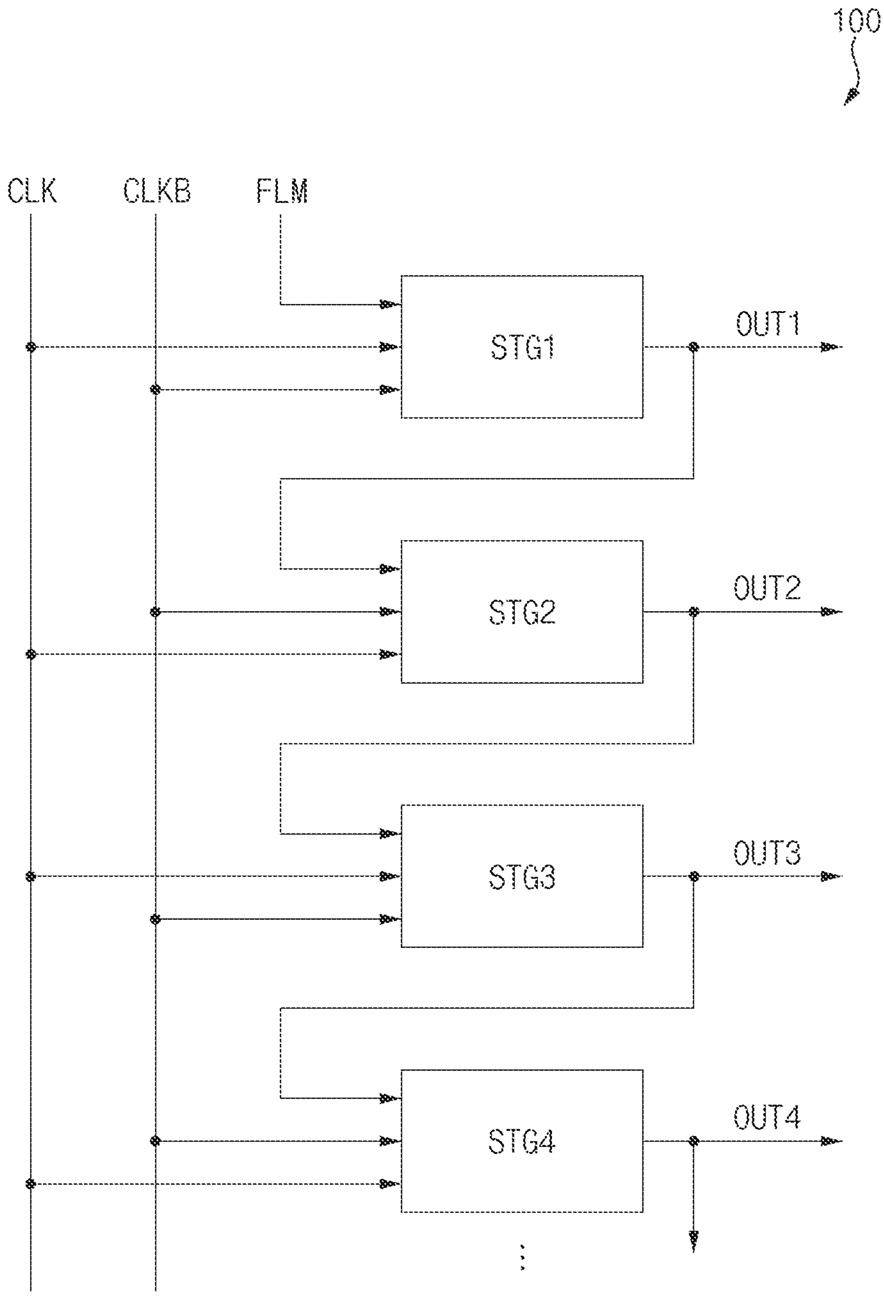
FIG. 1 is a block diagram illustrating an embodiment of a driver.

The embodiments are described more fully hereinafter with reference to the accompanying drawings. Like or similar reference numerals refer to like or similar elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
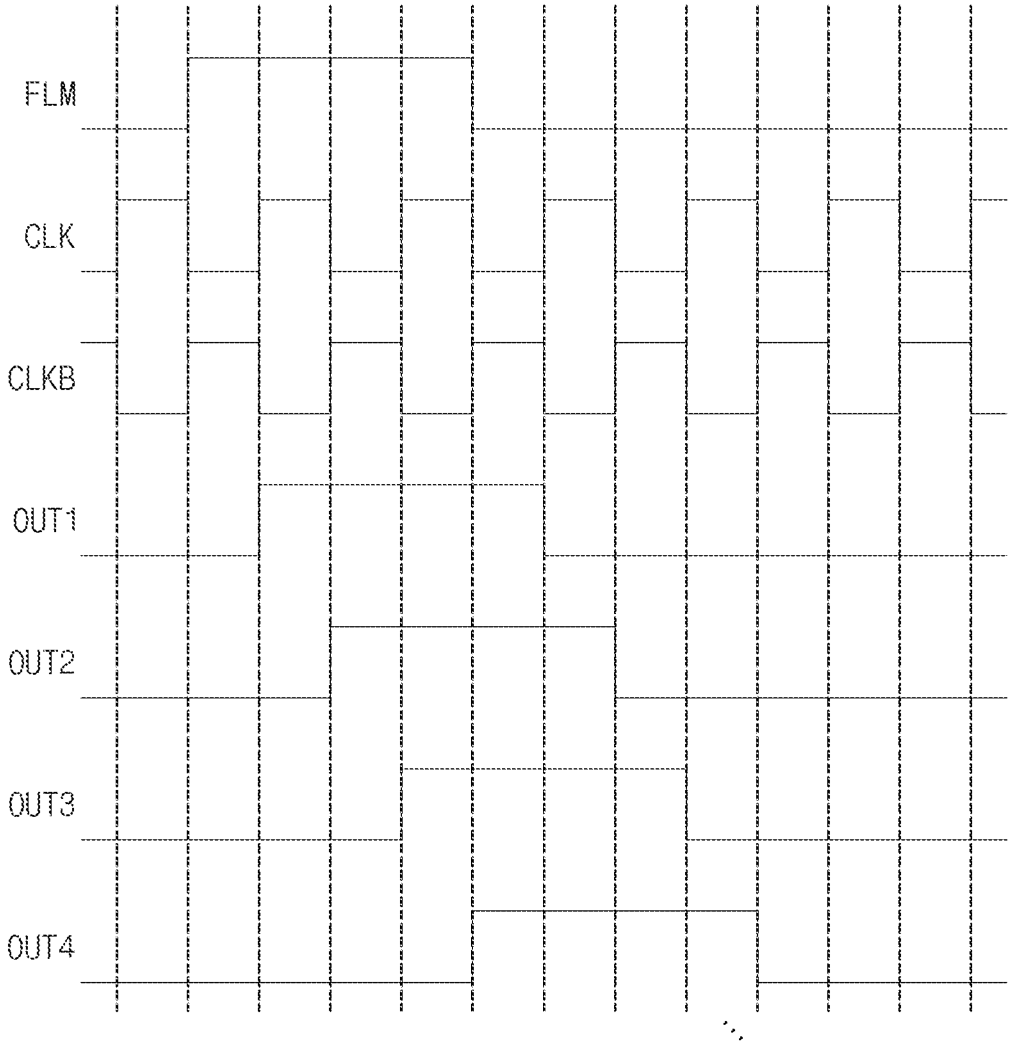
FIG. 2 is a timing diagram for describing an operation of a driver of FIG. 1.

FIG. 1 is a block diagram illustrating an embodiment of a driver, and FIG. 2 is a timing diagram for describing an operation of a driver of FIG. 1.

Referring to FIG. 1, a driver 100 in embodiments may include a plurality of stages STG1, STG2, STG3, STG4, etc. The driver 100 may be implemented in the form of a shift register in which a plurality of stages STG1, STG2, STG3, STG4, etc. sequentially output output signals OUT1, OUT2, OUT3, OUT4, etc. Further, the driver 100 may be included in a display device, and may be formed in a display panel of the display device. In an embodiment, the driver 100 may be integrated or formed on a substrate of the display panel, for example.

The plurality of stages STG1, STG2, STG3, STG4, etc., may sequentially output the output signals OUT1, OUT2, OUT3, OUT4, etc. based on a start signal FLM, a clock signal CLK and an inverted clock signal CLKB. Further, a first stage STG1 may receive the start signal FLM as an input signal, and each of subsequent stages STG2, STG3, STG4, etc., may receive the output signal of a previous stage as the input signal. In an embodiment, a second stage STG2 may receive a first output signal OUT1 of the first stage STG1 as the input signal, a third stage STG3 may receive a second output signal OUT2 of the second stage STG2 as the input signal, and a fourth stage STG4 may receive a third output signal OUT3 of the third stage STG3 as the input signal, for example.

In some embodiments, each odd-numbered stage STG1, STG3, etc., may start outputting the output signal OUT1, OUT3, etc., when the clock signal CLK has a relatively high level, and each even-numbered stage STG2, STG4, etc., may start outputting the output signal OUT2, OUT4, etc., when the inverted clock signal CLKB has the relatively high level. In an embodiment, as illustrated in FIGS. 1 and 2, when the clock signal CLK becomes the relatively high level after the start signal FLM becomes the relatively high level, the first stage STG1 may start outputting the first output signal OUT1 having the relatively high level, for example. Further, when the clock signal CLK becomes the relatively high level after the start signal FLM becomes a relatively low level, the first stage STG1 may start outputting the first output signal OUT1 having the relatively low level. When the inverted clock signal CLKB becomes the relatively high level after the first output signal OUT1 becomes the relatively high level, the second stage STG2 may start outputting the second output signal OUT2 having the relatively high level. Further, when the inverted clock signal CLKB becomes the relatively high level after the first output signal OUT1 becomes the relatively low level, the second stage STG2 may start outputting the second output signal OUT2 having the relatively low level. When the clock signal CLK becomes the relatively high level after the second output signal OUT2 becomes the relatively high level, the third stage STG3 may start outputting the third output signal OUT3 having the relatively high level. Further, when the clock signal CLK becomes the relatively high level after the second output signal OUT2 becomes the relatively low level, the third stage STG3 may start outputting the third output signal OUT3 having the relatively low level. When the inverted clock signal CLKB becomes the relatively high level after the third output signal OUT3 becomes the relatively high level, the fourth stage STG4 may start outputting the fourth output signal OUT4 having the relatively high level. Further, when the inverted clock signal CLKB becomes the relatively high level after the third output signal OUT3 becomes the relatively low level, the fourth stage STG4 may start outputting the fourth output signal OUT4 having the relatively low level. In this manner, the plurality of stages STG1, STG2, STG3, STG4, etc., may sequentially output the output signals OUT1, OUT2, OUT3, OUT4, etc., by delaying or shifting the output signals OUT1, OUT2, OUT3, OUT4, etc., by half a period of the clock signal CLK. In an embodiment, the relatively high level may be a logic high level and the relatively low level may be a logic low level, but the disclosure is not limited thereto.

Figure 3:
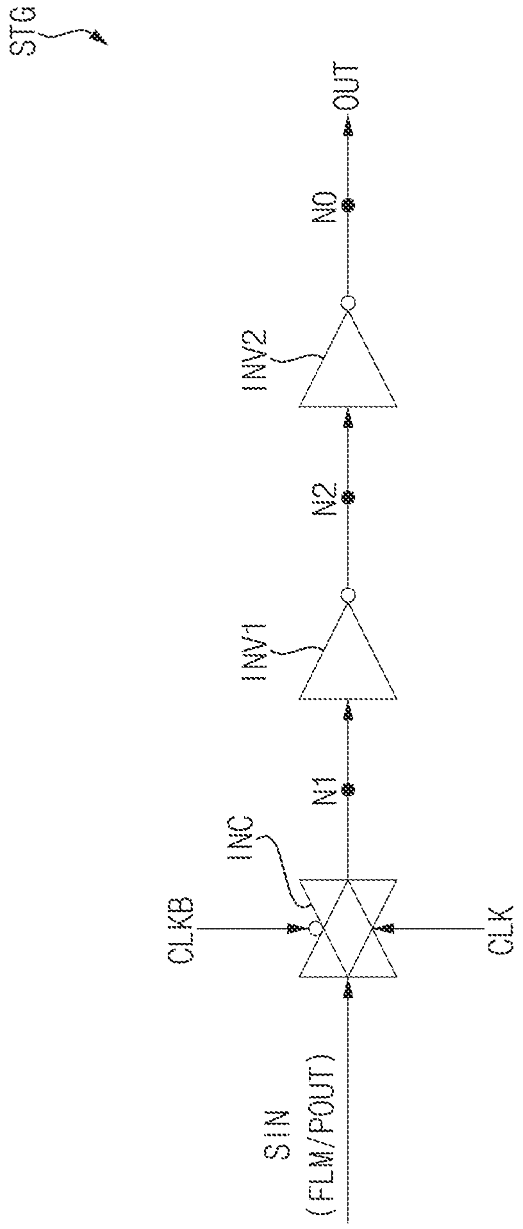
FIG. 3 is a circuit diagram illustrating an embodiment of a stage of a driver.
Figure 4:
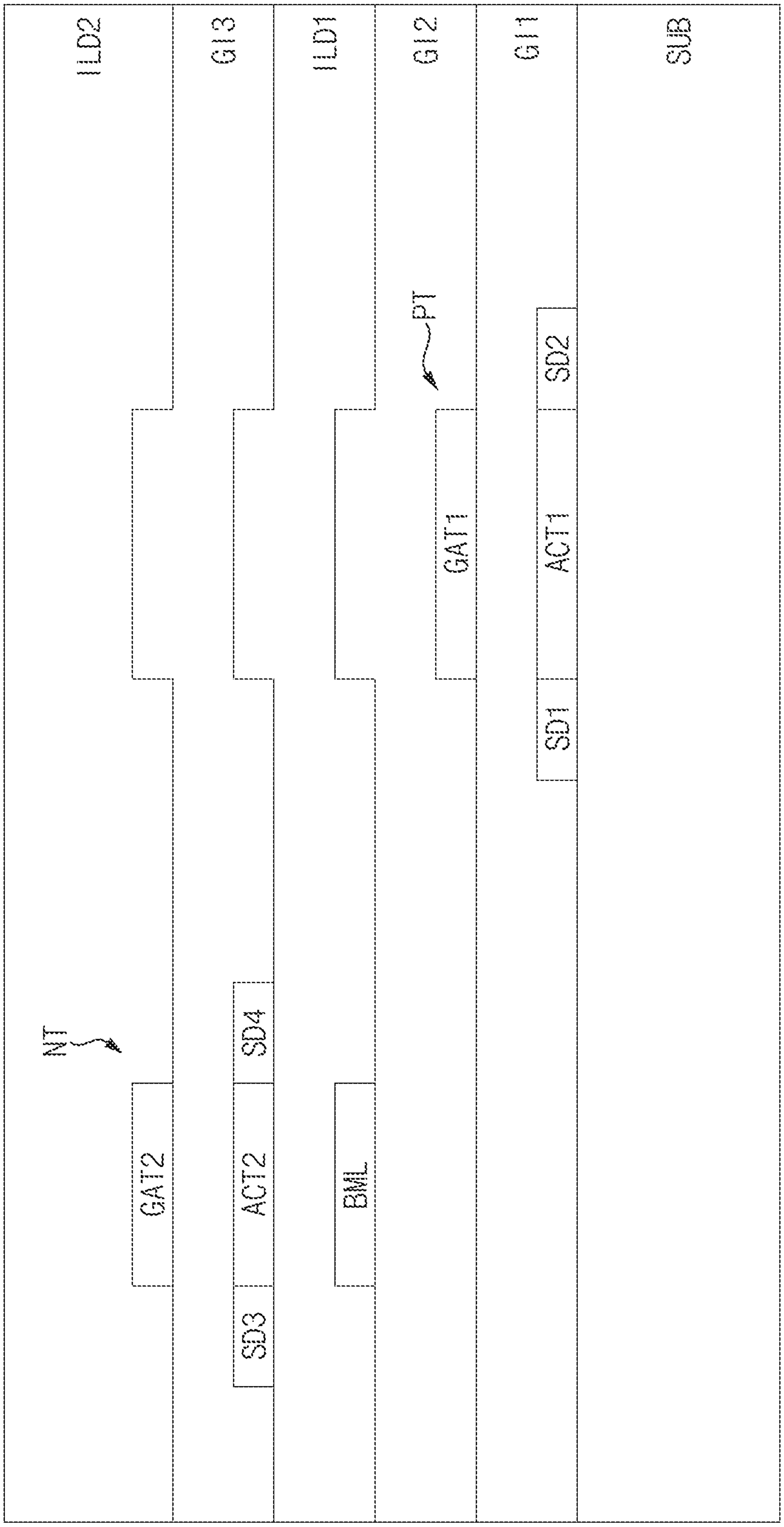
FIG. 4 is a cross-sectional diagram illustrating an embodiment of a p-type metal-oxide-semiconductor ("PMOS") transistor and an n-type metal-oxide-semiconductor ("NMOS") transistor included in the stage of FIG. 3.

FIG. 3 is a circuit diagram illustrating an embodiment of a stage of a driver, and FIG. 4 is a cross-sectional diagram illustrating an embodiment of a p-type metal-oxide-semiconductor ("PMOS") transistor and an n-type metal-oxide-semiconductor ("NMOS") transistor included in the stage of FIG. 3.

Referring to FIG. 3, each stage STG of a driver in embodiments may include an input circuit INC that transfers an input signal SIN to a first node N1, and inverters INV1 and INV2 that generate an output signal OUT based on a voltage of the first node N1.

The input circuit INC may transfer the input signal SIN to the first node N1 in response to at least one of a clock signal CLK and an inverted clock signal CLKB. In some embodiments, the input circuit INC of a first stage among a plurality of stages of the driver may receive a start signal FLM as the input signal SIN, and each of subsequent stages may receive an output signal POUT of a previous stage as the input signal SIN. Further, in some embodiments, the input circuit INC of an odd-numbered stage may transfer the input signal SIN to the first node N1 when the clock signal CLK has a relatively high level and the inverted clock signal CLKB has a relatively low level, and the input circuit INC of an even-numbered stage may transfer the input signal SIN to the first node N1 when the clock signal CLK has the relatively low level and the inverted clock signal CLKB has the relatively high level.

In some embodiments, as illustrated in FIG. 3, the input circuit INC may be implemented as a CMOS transmission gate including a PMOS transistor and an NMOS transistor connected in parallel. In other embodiments, the input circuit INC may include only the PMOS transistor, or may include only the NMOS transistor.

The stage STG may include an inverter chain including an even number of the inverters INV1 and INV2 connected in series. In some embodiments, as illustrated in FIG. 3, the stage STG may include two inverters INV1 and INV2. A first inverter INV1 may include an input terminal connected to the first node N1 and an output terminal connected to a second node N2, and may invert the voltage of the first node N1. Further, a second inverter INV2 may include an input terminal connected to the second node N2 and an output terminal connected to an output node NO, and may invert a voltage of the second node N2 to generate the output signal OUT. Accordingly, the output signal OUT having a voltage corresponding to the voltage of the first node N1 may be output at the output node NO.

In each stage STG of the driver in embodiments, at least one of the inverters INV1 and INV2 may include a PMOS transistor and an NMOS transistor connected in series between a line transferring a relatively high gate voltage and a line transferring a relatively low gate voltage. In some embodiments, a first active region of the PMOS transistor may include or consist of materials different from materials of a second active region of the NMOS transistor. Further, in some embodiments, the NMOS transistor may include a top gate disposed above the second active region and a bottom gate disposed below the second active region.

In an embodiment, as illustrated in FIG. 4, a first source/drain region SD1, the first active region ACT1 and a second source/drain region SD2 of the PMOS transistor PT may be formed on a substrate SUB of a display panel, for example. In some embodiments, a buffer layer may be further formed between the substrate SUB and the first active region ACT1 to prevent impurities, but the disclosure is not limited thereto. The first active region ACT1 of the PMOS transistor PT may include or consist of polycrystalline silicon, e.g., relatively low temperature polycrystalline silicon ("LTPS"). Further, the first and second source/drain regions SD1 and SD2 may be p+ doped regions, and may serve as a source and a drain of the PMOS transistor PT, respectively. A first gate insulating layer GI1 may be formed on the first source/drain region SD1, the first active region ACT1 and the second source/drain region SD2. In an embodiment, the first gate insulating layer GI1 may include or consist of silicon oxide, for example, but is not limited thereto. Further, a gate GAT1 of the PMOS transistor PT may be formed on the first gate insulating layer (or film) GI1. In an embodiment, the gate GAT1 of the PMOS transistor PT may include or consist of a metal material such as molybdenum, for example, but is not limited thereto. A second gate insulating layer GI2 may be formed on the gate GAT1 of the PMOS transistor PT. In an embodiment, the second gate insulating layer GI2 may include or consist of silicon nitride, for example, but is not limited thereto.

Further, the bottom gate BML of the NMOS transistor NT may be formed on the second gate insulating layer (or film) GI2. In an embodiment, the bottom gate BML may include or consist of a metal material such as molybdenum, for example, but is not limited thereto. In some embodiments, a second relatively low gate voltage different from the relatively low gate voltage that is a relatively low voltage of the input signal SIN, the clock signal CLK, the inverted clock signal CLKB and the output signal OUT may be applied to the bottom gate BML of the NMOS transistor NT. The second relatively low gate voltage applied to the bottom gate BML may serve as a body bias voltage of the NMOS transistor NT, and a threshold voltage of the NMOS transistor NT may be adjusted by adjusting the second relatively low gate voltage. In an embodiment, the second relatively low gate voltage lower than the relatively low gate voltage may be applied to the bottom gate BML, and thus the threshold voltage of the NMOS transistor NT may be increased, for example. In this case, a leakage current flowing through the NMOS transistor NT may be reduced. In other embodiments, the bottom gate BML of the NMOS transistor NT may be connected to the top gate GAT2 of the NMOS transistor NT. In this case, when the NMOS transistor NT is turned on, the NMOS transistor NT may have an upper channel and a lower channel, and thus an on-current of the NMOS transistor may be increased. A first inter-insulating layer ILD1 may be formed on the bottom gate BML. In an embodiment, the first inter-insulating layer (or film) ILD1 may include or consist of silicon oxide or silicon nitride, for example, but is not limited thereto.

A third source/drain region SD3, the second active region ACT2 and a fourth source/drain region SD4 of the NMOS transistor NT may be formed on the first inter-insulating layer ILD1. The second active region ACT2 of the NMOS transistor NT may include or consist of a material different from the material of the first active region ACT1 of the PMOS transistor PT. In an embodiment, the second active region ACT2 of the NMOS transistor NT may include or consist of an oxide semiconductor, an organic semiconductor, amorphous silicon, etc., for example. That is, in some embodiments, the first active region ACT1 of the PMOS transistor PT may include polycrystalline silicon, and the second active region ACT2 of the NMOS transistor NT may include an oxide semiconductor. In other embodiments, the first active region ACT1 of the PMOS transistor PT may include polycrystalline silicon, and the second active region ACT2 of the NMOS transistor NT may include an organic semiconductor. In still other embodiments, the first active region ACT1 of the PMOS transistor PT may include polycrystalline silicon, and the second active region ACT2 of the NMOS transistor NT may include amorphous silicon. Further, in some embodiments, as illustrated in FIG. 4, the first active region ACT1 of the PMOS transistor PT and the second active region ACT2 of the NMOS transistor NT may be formed in different layers, respectively, disposed at different heights, respectively, from the substrate SUB of the display panel. The third and fourth source/drain regions SD3 and SD4 may be n+ doped regions, and may serve as a source and a drain of the NMOS transistor NT, respectively. A third gate insulating layer GI3 may be formed on the third source/drain region SD3, the second active region ACT2 and the fourth source/drain region SD4. In an embodiment, the third gate insulating layer GI3 may include or consist of silicon nitride, but is not limited thereto. Further, the top gate GAT2 of the NMOS transistor NT may be formed on the third gate insulating layer (or film) GI3, for example. In an embodiment, the top gate GAT2 of the NMOS transistor NT may include or consist of a metal material such as molybdenum or titanium, for example, but is not limited thereto. A second inter-insulating layer ILD2 may be formed on the top gate GAT2 of the NMOS transistor NT. In an embodiment, the second inter-insulating layer (or film) ILD2 may include or consist of silicon oxide or silicon nitride, for example, but is not limited thereto.

Each stage of a conventional driver may include only a single type of transistor. In an embodiment, in a case where each stage includes only a PMOS transistor, to output an output signal having a relatively low voltage level, a bootstrapping operation that decreases a voltage of an internal node of the stage to a voltage level lower than the relatively low voltage level should be performed, for example. Further, in a case where each stage includes only an NMOS transistor, to output an output signal having a relatively high voltage level, a bootstrapping operation that increases a voltage of an internal node of the stage to a voltage level higher than the relatively high voltage level should be performed.

However, as described above, in each stage STG of the driver in embodiments, at least one of the inverters INV1 and INV2 may include both of the PMOS transistor PT and the NMOS transistor NT, and the first active region ACT1 of the PMOS transistor PT may include or consist of materials different from materials of the second active region ACT2 of the NMOS transistor NT. Further, in some embodiments, the PMOS transistor PT may output the output signal OUT having the relatively high voltage level, and the NMOS transistor NT may output the output signal OUT having the relatively low voltage level. Accordingly, the bootstrapping operation may not be desired in the stage, and power consumption of the driver and a display device including the driver may be reduced.

Figure 5:
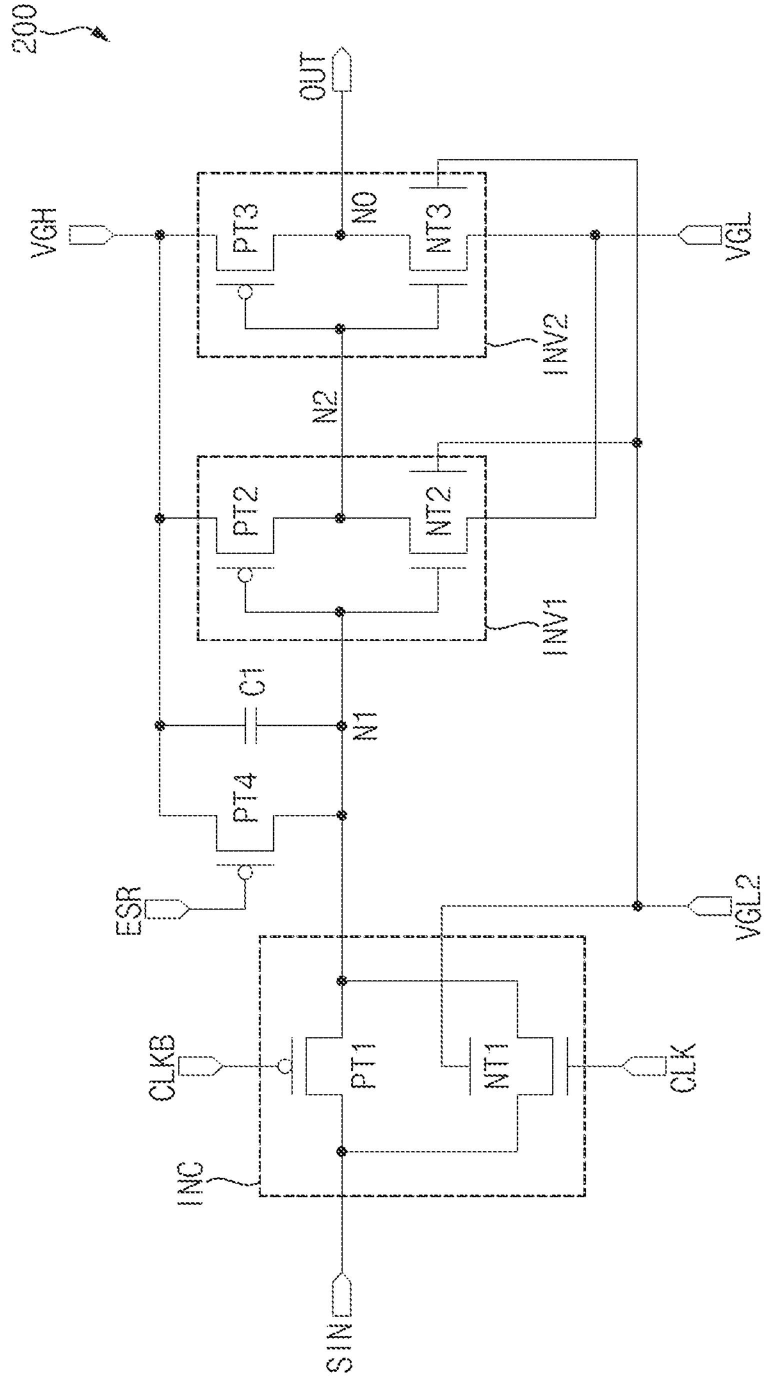
FIG. 5 is a circuit diagram illustrating an embodiment of a stage of a driver.
Figure 6:
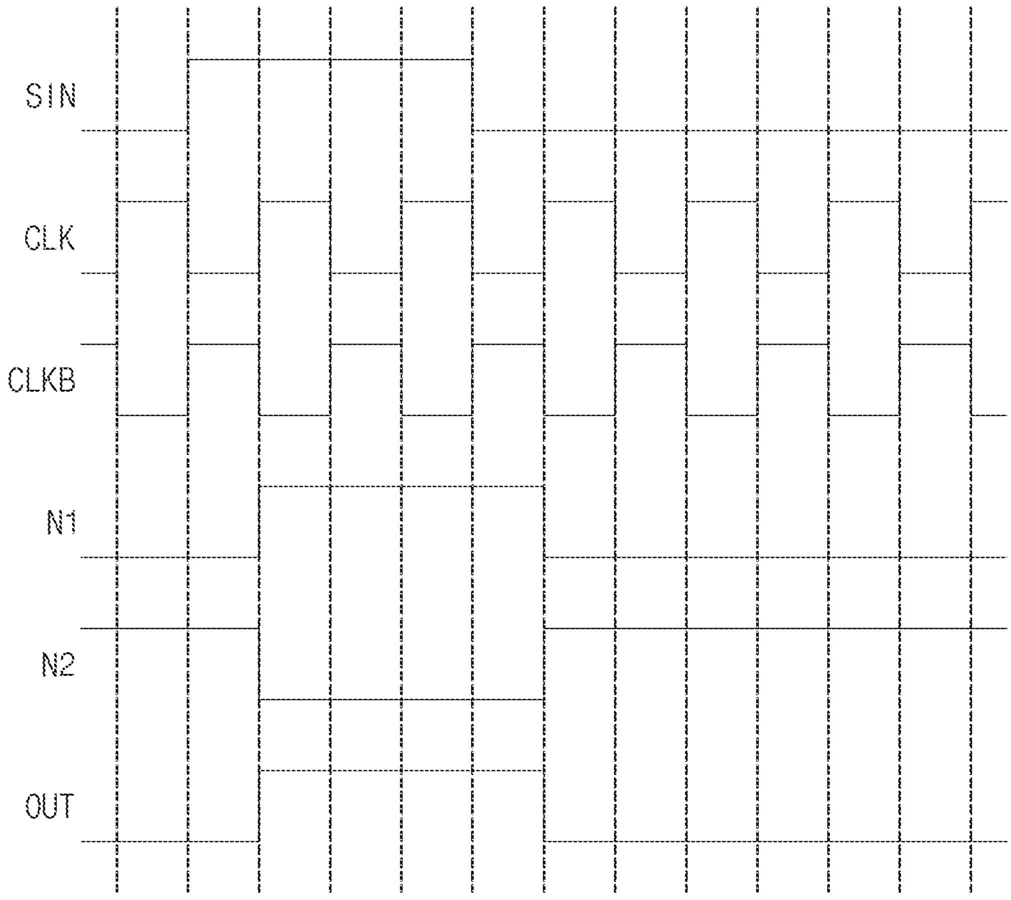
FIG. 6 is a timing diagram for describing an embodiment of an operation of a stage of FIG. 5.

FIG. 5 is a circuit diagram illustrating an embodiment of a stage of a driver, and FIG. 6 is a timing diagram for describing an embodiment of an operation of a stage of FIG. 5.

Referring to FIG. 5, a stage 200 of a driver in embodiments may include an input circuit INC, a first inverter INV1 and a second inverter INV2. In some embodiments, the stage 200 may further include a first capacitor C1 and/or a fourth PMOS transistor PT4.

The input circuit INC may transfer an input signal SIN to a first node N1 in response to at least one of a clock signal CLK and an inverted clock signal CLKB. In some embodiments, the input circuit INC may include a first PMOS transistor PT1 that transfers the input signal SIN to the first node N1 in response to the inverted clock signal CLKB. In other embodiments, the input circuit INC may include a first NMOS transistor NT1 that transfers the input signal SIN to the first node N1 in response to the clock signal CLK. In still other embodiments, as illustrated in FIG. 5, the input circuit INC may include the first PMOS transistor PT1 and the first NMOS transistor NT1 connected in parallel. That is, the input circuit INC may be implemented as a CMOS transmission gate. Further, in some embodiments, the first PMOS transistor PT1 may include a gate receiving the inverted clock signal CLKB, a first terminal receiving the input signal SIN, and a second terminal connected to the first node N1, and the first NMOS transistor NT1 may include a gate receiving the clock signal CLK, a first terminal receiving the input signal SIN, and a second terminal connected to the first node N1.

Referring to FIGS. 5 and 6, after the input signal SIN becomes a relatively high level, when the clock signal CLK has the relatively high level and the inverted clock signal CLKB has a relatively low level, the first PMOS transistor PT1 and the first NMOS transistor NT1 of the input circuit INC may be turned on to transfer the input signal SIN having the relatively high level to the first node N1. Thus, a voltage of the first node N1 may be changed to the relatively high level. Further, after the input signal SIN becomes the relatively low level, when the clock signal CLK has the relatively high level and the inverted clock signal CLKB has the relatively low level, the first PMOS transistor PT1 and the first NMOS transistor NT1 of the input circuit INC may be turned on to transfer the input signal SIN having the relatively low level to the first node N1. Thus, the voltage of the first node N1 may be changed to the relatively low level. FIGS. 5 and 6 illustrate an embodiment of the input circuit INC of an odd-numbered stage 200 that transfers the input signal SIN to the first node N1 when the clock signal CLK has the relatively high level and the inverted clock signal CLKB has the relatively low level. However, the input circuit INC of an even-numbered stage may transfer the input signal SIN to the first node N1 when the clock signal CLK has the relatively low level and the inverted clock signal CLKB has the relatively high level. That is, the first PMOS transistor PT1 of the input circuit INC of the even-numbered stage may receive the clock signal CLK, and the first NMOS transistor NT1 of the input circuit INC of the even-numbered stage may receive the inverted clock signal CLKB.

The first capacitor C1 may hold the voltage of the first node N1 while the first PMOS transistor PT1 and the first NMOS transistor NT1 of the input circuit INC are turned off. In some embodiments, as illustrated in FIG. 5, the first capacitor C1 may be connected between a line transferring a relatively high gate voltage VGH and the first node N1. That is, the first capacitor C1 may include a first electrode connected to the line transferring the relatively high gate voltage VGH and a second electrode connected to the first node N1. In other embodiments, the first capacitor C1 may be connected between a line transferring a relatively low gate voltage VGL and the first node N1.

The first inverter INV1 may be implemented as a first CMOS inverter including a second PMOS transistor PT2 and a second NMOS transistor NT2 connected in series between the line transferring the relatively high gate voltage VGH and the line transferring the relatively low gate voltage VGL. In some embodiments, the second PMOS transistor PT2 may include a gate connected to the first node N1, a first terminal connected to the line transferring the relatively high gate voltage VGH, and a second terminal connected to a second node N2, and the second NMOS transistor NT2 may include a gate connected to the first node N1, a first terminal connected to the line transferring the relatively low gate voltage VGL, and a second terminal connected to the second node N2.

The first inverter INV1 may provide an inverted voltage to the second node N2 by inverting the voltage of the first node N1. In an embodiment, as illustrated in FIG. 6, the first inverter INV1 may provide a voltage having the relatively low level to the second node N2 when the voltage of the first node N1 has the relatively high level, and may provide a voltage having the relatively high level to the second node N2 when the voltage of the first node N1 has the relatively low level, for example. That is, when the voltage of the first node N1 has the relatively high level, the second NMOS transistor NT2 may be turned on, and the second NMOS transistor NT2 may transfer the relatively low gate voltage VGL to the second node N2. Further, when the voltage of the first node N1 has the relatively low level, the second PMOS transistor PT2 may be turned on, and the second PMOS transistor PT2 may transfer the relatively high gate voltage VGH to the second node N2.

The second inverter INV2 may be implemented as a second CMOS inverter including a third PMOS transistor PT3 and a third NMOS transistor NT3 connected in series between the line transferring the relatively high gate voltage VGH and the line transferring the relatively low gate voltage VGL. In some embodiments, the third PMOS transistor PT3 may include a gate connected to the second node N2, a first terminal connected to the line transferring the relatively high gate voltage VGH, and a second terminal connected to an output node NO at which an output signal OUT is output, and the third NMOS transistor NT3 may include a gate connected to the second node N2, a first terminal connected to the line transferring the relatively low gate voltage VGL, and a second terminal connected to the output node NO.

The second inverter INV2 may generate the output signal OUT by inverting a voltage of the second node N2. In an embodiment, as illustrated in FIG. 6, the second inverter INV2 may generate the output signal OUT having the relatively low level when the voltage of the second node N2 has the relatively high level, and may generate the output signal OUT having the relatively high level when the voltage of the second node N2 has the relatively low level, for example. That is, when the voltage of the second node N2 has the relatively high level, the third NMOS transistor NT3 may be turned on, and the third NMOS transistor NT3 may output the relatively low gate voltage VGL as the output signal OUT at the output node NO. Further, when the voltage of the second node N2 has the relatively low level, the third PMOS transistor PT3 may be turned on, and the third PMOS transistor PT3 may output the relatively high gate voltage VGH as the output signal OUT at the output node NO.

The fourth PMOS transistor PT4 may transfer the relatively high gate voltage VGH to the first node N1 in response to a global reset signal ESR. In some embodiments, the global reset signal ESR may have the relatively low level when a power-on sequence of a display device is performed, and may be substantially simultaneously provided to a plurality of stages of the driver. Thus, the fourth PMOS transistors PT4 of the plurality of stages may transfer the relatively high gate voltage VGH to the first nodes N1 of the plurality of stages during the power-on sequence, thereby stabilizing voltages of nodes N1, N2 and NO of the plurality of stages during the power-on sequence. Further, in some embodiments, the fourth PMOS transistor PT4 may include a gate receiving the global reset signal ESR, a first terminal connected to the line transferring the relatively high gate voltage VGH, and a second terminal connected to the first node N1. Although FIG. 5 illustrates an embodiment in which the fourth PMOS transistor PT4 is connected to the line transferring the relatively high gate voltage VGH, in other embodiments, the fourth PMOS transistor PT4 may be connected to the line transferring the relatively low gate voltage VGL. In this case, the fourth PMOS transistor PT4 may transfer the relatively low gate voltage VGL to the first node N1 during the power-on sequence.

In the stage 200, active regions of the first through fourth PMOS transistors PT1 through PT4 may include or consist of materials different from materials of active regions of the first through third NMOS transistors NT1 through NT3. In an embodiment, the active regions of the first through fourth PMOS transistors PT1 through PT4 may include or consist of polycrystalline silicon, and the active regions of the first through third NMOS transistors NT1 through NT3 may include or consist of an oxide semiconductor, an organic semiconductor, amorphous silicon, etc., for example.

Further, in the stage 200, as illustrated in FIG. 5, each of the first through third NMOS transistors NT1 through NT3 may include a bottom gate, and the bottom gate may be connected to a line transferring a second relatively low gate voltage VGL2. That is, the second relatively low gate voltage VGL2 different from the relatively low gate voltage VGL may be applied to the bottom gate. Accordingly, by adjusting the second relatively low gate voltage VGL2, a threshold voltage of each of the first through third NMOS transistors NT1 through NT3 may be adjusted. In some embodiments, the second relatively low gate voltage VGL2 may be lower than the relatively low gate voltage VGL. In this case, the threshold voltage of each of the first through third NMOS transistors NT1 through NT3 may be increased, and thus a leakage current flowing through the first through third NMOS transistors NT1 through NT3 may be reduced.

Figure 7:
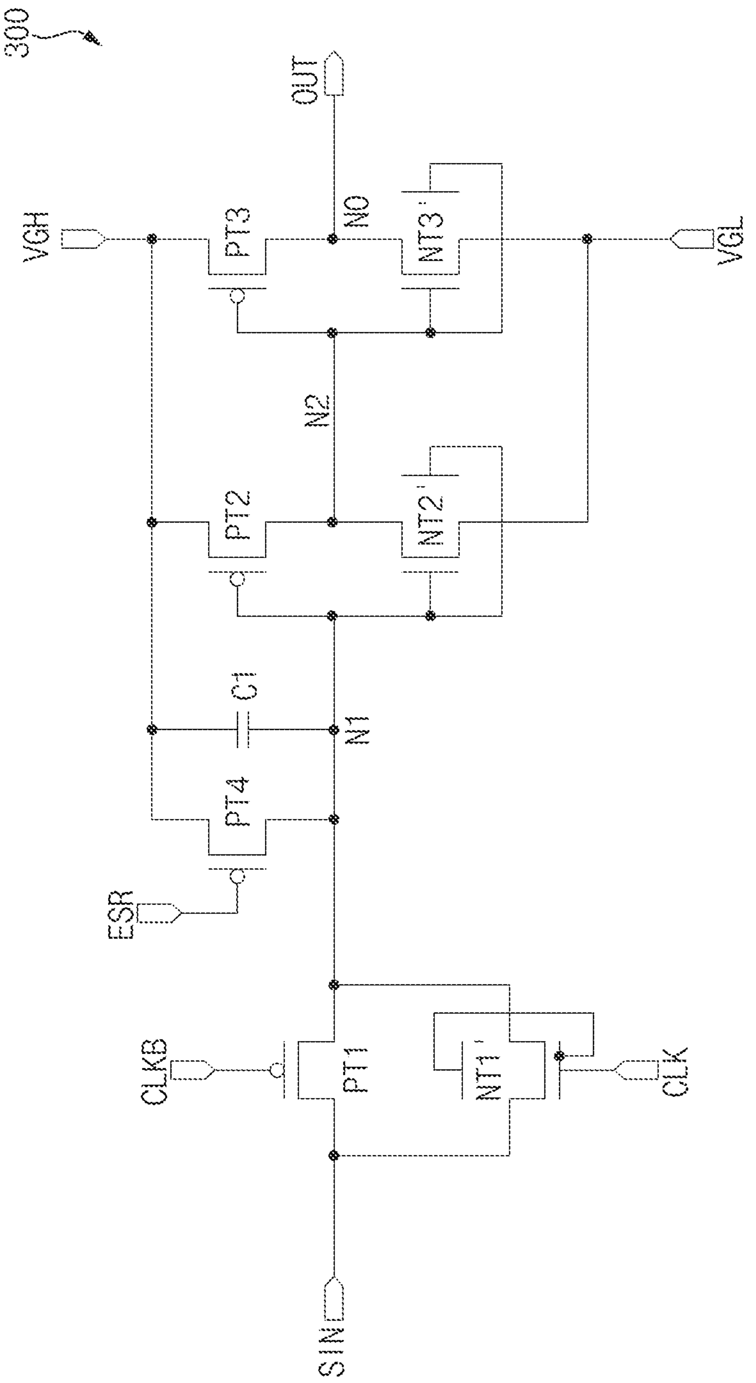
FIG. 7 is a circuit diagram illustrating an embodiment of a stage of a driver.

FIG. 7 is a circuit diagram illustrating an embodiment of a stage of a driver.

Referring to FIG. 7, a stage 300 of a driver in embodiments may include a first PMOS transistor PT1, a second PMOS transistor PT2, a third PMOS transistor PT3, a fourth PMOS transistor PT4, a first NMOS transistor NT1', a second NMOS transistor NT2', a third NMOS transistor NT3' and a first capacitor C1. The stage 300 of FIG. 7 may have substantially the same configuration and operation as a stage 200 of FIG. 5, except that a bottom gate of each of the first through third NMOS transistors NT1' through NT3' may be connected to its top gate.

As illustrated in FIG. 7, the bottom gate of the first NMOS transistor NT1' may be connected to the top gate of the first NMOS transistor NT1', the bottom gate of the second NMOS transistor NT2' may be connected to the top gate of the second NMOS transistor NT2', and the bottom gate of the third NMOS transistor NT3' may be connected to the top gate of the third NMOS transistor NT3'. In this case, when each of the first through third NMOS transistors NT1' through NT3' is turned on, each of the first through third NMOS transistors NT1' through NT3' may have an upper channel by the top gate and a lower channel by the bottom gate, and thus an on-current of each of the first through third NMOS transistors NT1' through NT3' may be increased.

Figure 8:
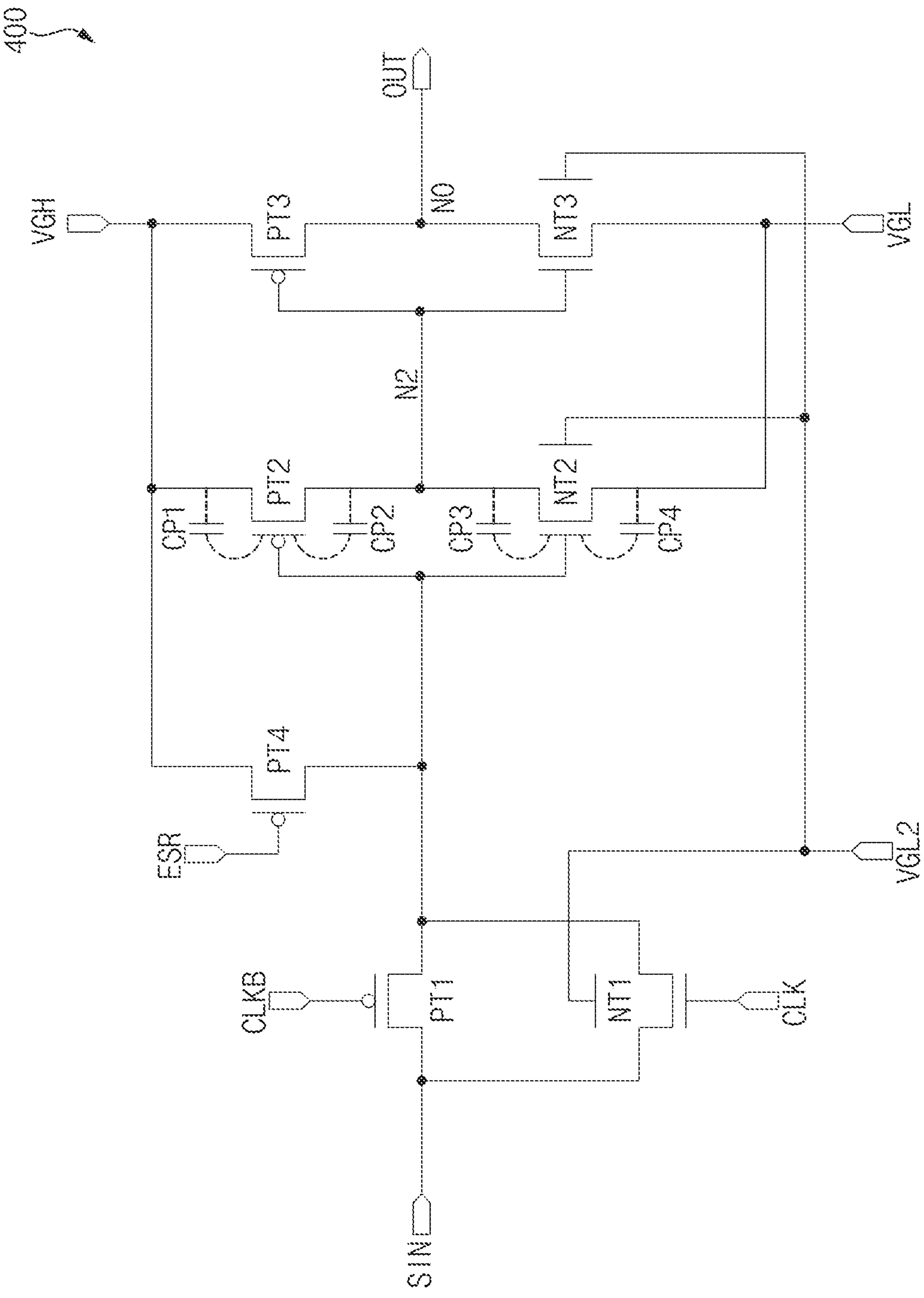
FIG. 8 is a circuit diagram illustrating an embodiment of a stage of a driver.

FIG. 8 is a circuit diagram illustrating an embodiment of a stage of a driver.

Referring to FIG. 8, a stage 400 of a driver in embodiments may include a first PMOS transistor PT1, a second PMOS transistor PT2, a third PMOS transistor PT3, a fourth PMOS transistor PT4, a first NMOS transistor NT1, a second NMOS transistor NT2, and a third NMOS transistor NT3. The stage 400 of FIG. 8 may have substantially the same configuration and operation as a stage 200 of FIG. 5, except that the stage 400 may not include a first capacitor.

The stage 400 may not include the first capacitor for holding a voltage of a first node N1. In the stage 400, while the first PMOS transistor PT1 and the first NMOS transistor NT1 of an input circuit are turned off, instead of the first capacitor, parasitic capacitors CP1, CP2, CP3 and CP4 of the second PMOS and NMOS transistors PT2 and NT2 may hold the voltage of the first node N1. In an embodiment, a first parasitic capacitor CP1 between a gate and a source of the second PMOS transistor PT2, a second parasitic capacitor CP2 between the gate and a drain of the second PMOS transistor PT2, a third parasitic capacitor CP3 between a top gate and a drain of the second NMOS transistor NT2, and a fourth parasitic capacitor CP4 between the top gate and a source of the second NMOS transistor NT2 may hold the voltage of the first node N1, for example.

Figure 9:
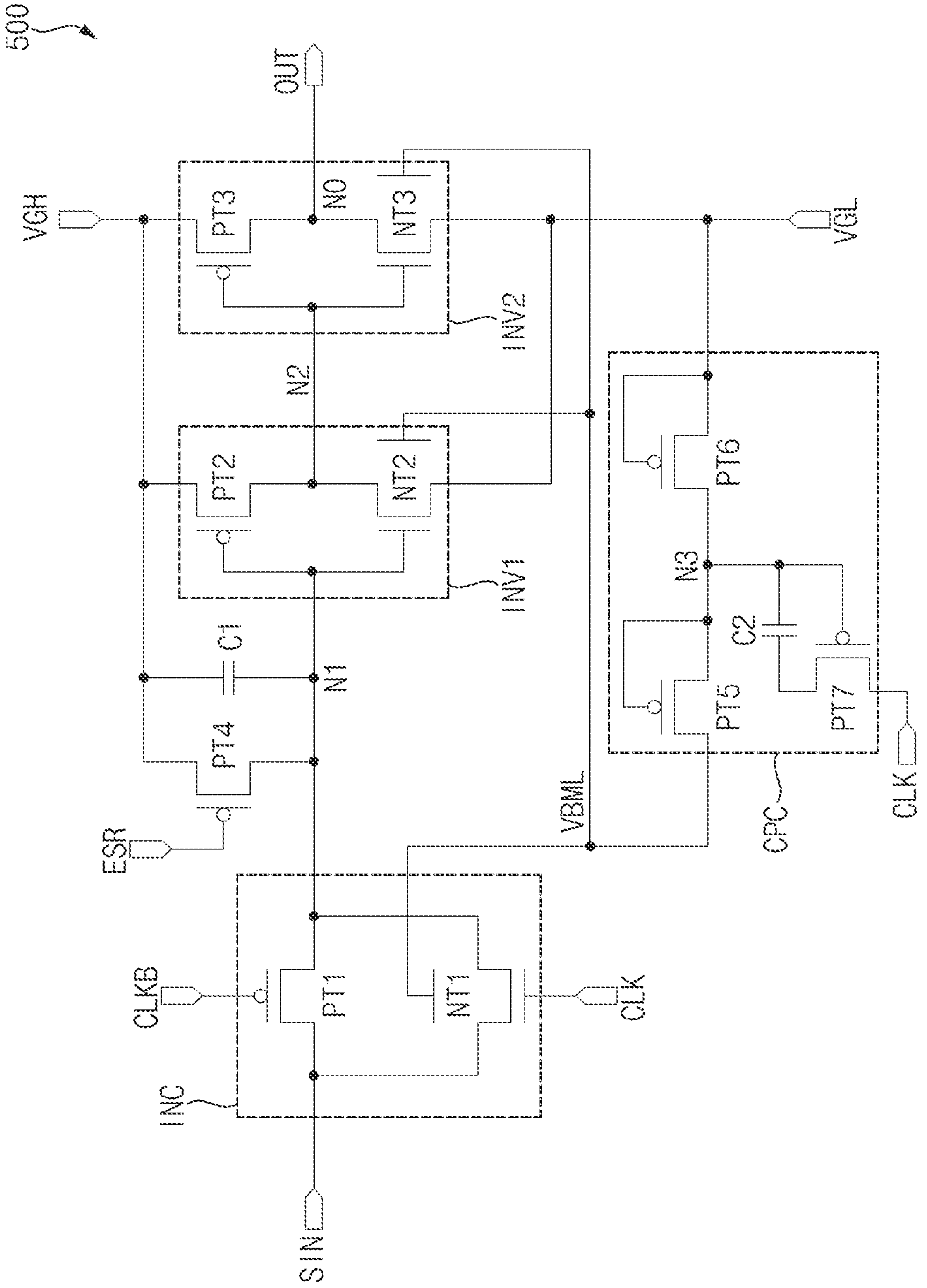
FIG. 9 is a circuit diagram illustrating an embodiment of a stage of a driver.
Figure 10:
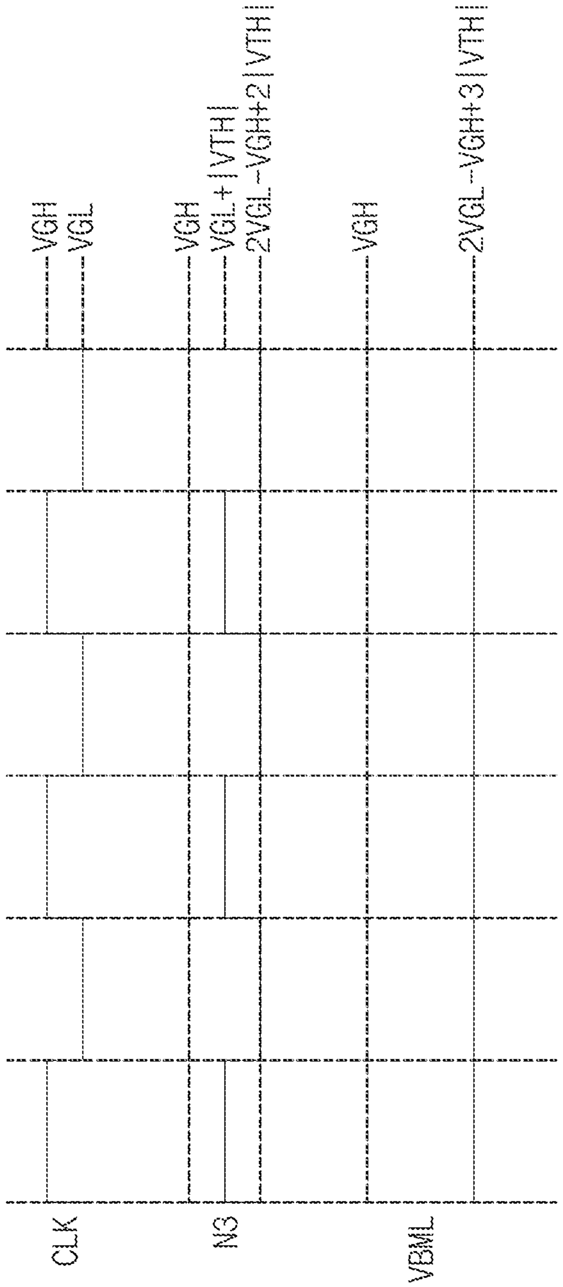
FIG. 10 is a timing diagram for describing an embodiment of an operation of a charge pump circuit included in a stage of FIG. 9.

FIG. 9 is a circuit diagram illustrating an embodiment of a stage of a driver, and FIG. 10 is a timing diagram for describing an embodiment of an operation of a charge pump circuit included in a stage of FIG. 9.

Referring to FIG. 9, a stage 500 of a driver in embodiments may include an input circuit INC, a first inverter INV1, a second inverter INV2, a fourth PMOS transistor PT4, a first capacitor C1 and a charge pump circuit CPC. The stage 500 of FIG. 9 may have substantially the same configuration and operation as a stage 200 of FIG. 5, except that the stage 500 may further include the charge pump circuit CPC.

The stage 500 may not receive a second relatively low gate voltage applied to a bottom gate of each of first through third NMOS transistors NT1 through NT3, and the charge pump circuit CPC may generate a bottom gate voltage VBML applied to the bottom gate based on a relatively low gate voltage VGL and a clock signal CLK. In some embodiments, the charge pump circuit CPC may include a fifth PMOS transistor PT5, a sixth PMOS transistor PT6, a second capacitor C2 and a seventh PMOS transistor PT7. The fifth PMOS transistor PT5 may include a gate connected to a third node N3, a first terminal connected to the bottom gate, and a second terminal connected to the third node N3. The sixth PMOS transistor PT6 may include a gate connected to a line transferring the relatively low gate voltage VGL, a first terminal connected to the third node N3, and a second terminal connected to the line transferring the relatively low gate voltage VGL. The second capacitor C2 may include a first electrode connected to the third node N3, and a second electrode. The seventh PMOS transistor PT7 may include a gate connected to the third node N3, a first terminal connected to the second electrode of the second capacitor C2, and a second terminal receiving the clock signal CLK. Since the gate and the second terminal of the sixth PMOS transistor PT6 are connected to each other, the sixth PMOS transistor PT6 may function as a diode that allows a current to flow only in a direction from the third node N3 to the line transferring the relatively low gate voltage VGL. Further, since the gate and the second terminal of the fifth PMOS transistor PT5 are connected to each other, the fifth PMOS transistor PT5 may function as a diode that allows a current to flow only in a direction from the bottom gate to the third node N3.

Referring to FIGS. 9 and 10, when a voltage of the third node N3 is higher than the relatively low gate voltage VGL, a current may flow from the third node N3 from through the sixth PMOS transistor PT6 to the line transferring the relatively low gate voltage VGL, and thus the voltage of the third node N3 may become a sum VGL+|VTH| of the relatively low gate voltage VGL and an absolute value |VTH| of a threshold voltage of the sixth PMOS transistor PT6. Further, while the clock signal CLK has a relatively high gate voltage VGH, the seventh PMOS transistor PT7 may transfer the relatively high gate voltage VGH to the second electrode of the second capacitor C2, and a voltage of the second electrode of the second capacitor C2 may become a voltage VGH−|VTH| obtained by subtracting an absolute value |VTH| of a threshold voltage of the seventh PMOS transistor PT7 from the relatively high gate voltage VGH. Further, when the clock signal CLK is changed from the relatively high gate voltage VGH to the relatively low gate voltage VGL, the voltage of the second electrode of the second capacitor C2 may be decreased by "VGH−VGL−|VTH|", and a voltage of the third node N3 connected to the first electrode of the second capacitor C2 also may be decreased by "VGH−VGL−|VTH|". Thus, while the clock signal CLK has the relatively low gate voltage VGL, the voltage of the third node N3 may become "VGL+|VTH|−(VGH−VGL−|VTH|)", or "2VGL−VGH+2|VTH|". In addition, since a current flows from the bottom gate through the seventh PMOS transistor PT7 to the third node N3 only when the bottom gate voltage VBML is higher than the voltage of the third node N3, the bottom gate and the third node N3 may be electrically separated from each other when the voltage of the third node N3 is "VGL+|VTH|", and the bottom gate may be electrically connected to the third node N3 through the seventh PMOS transistor PT7 when the voltage of the third node N3 is "2VGL−VGH+2|VTH|". Accordingly, the bottom gate voltage VBML may become a sum of the voltage of the third node N3 and an absolute value |VTH| of a threshold voltage of the fifth PMOS transistor PT5, or "2VGL−VGH+3|VTH|". In an embodiment, in a case where the relatively high gate voltage VGH is about 7 volts (V), the relatively low gate voltage VGL is about −8V, and the absolute value |VTH| of the threshold voltage of each of the fifth through seventh PMOS transistors PT5 through PT7 is about 2V, the bottom gate voltage VBML may be "2×(−8)−7+6" V, or about −17V, which is lower than the relatively low gate voltage VGL, for example. Further, when the bottom gate voltage VBML lower than the relatively low gate voltage VGL is applied to the bottom gate of each of the first through third NMOS transistors NT1 through NT3, a threshold voltage of the first through third NMOS transistors NT1 through NT3 may be increased, and leakage currents flowing through the first through third NMOS transistors NT1 through NT3 may be reduced.

Figure 11:
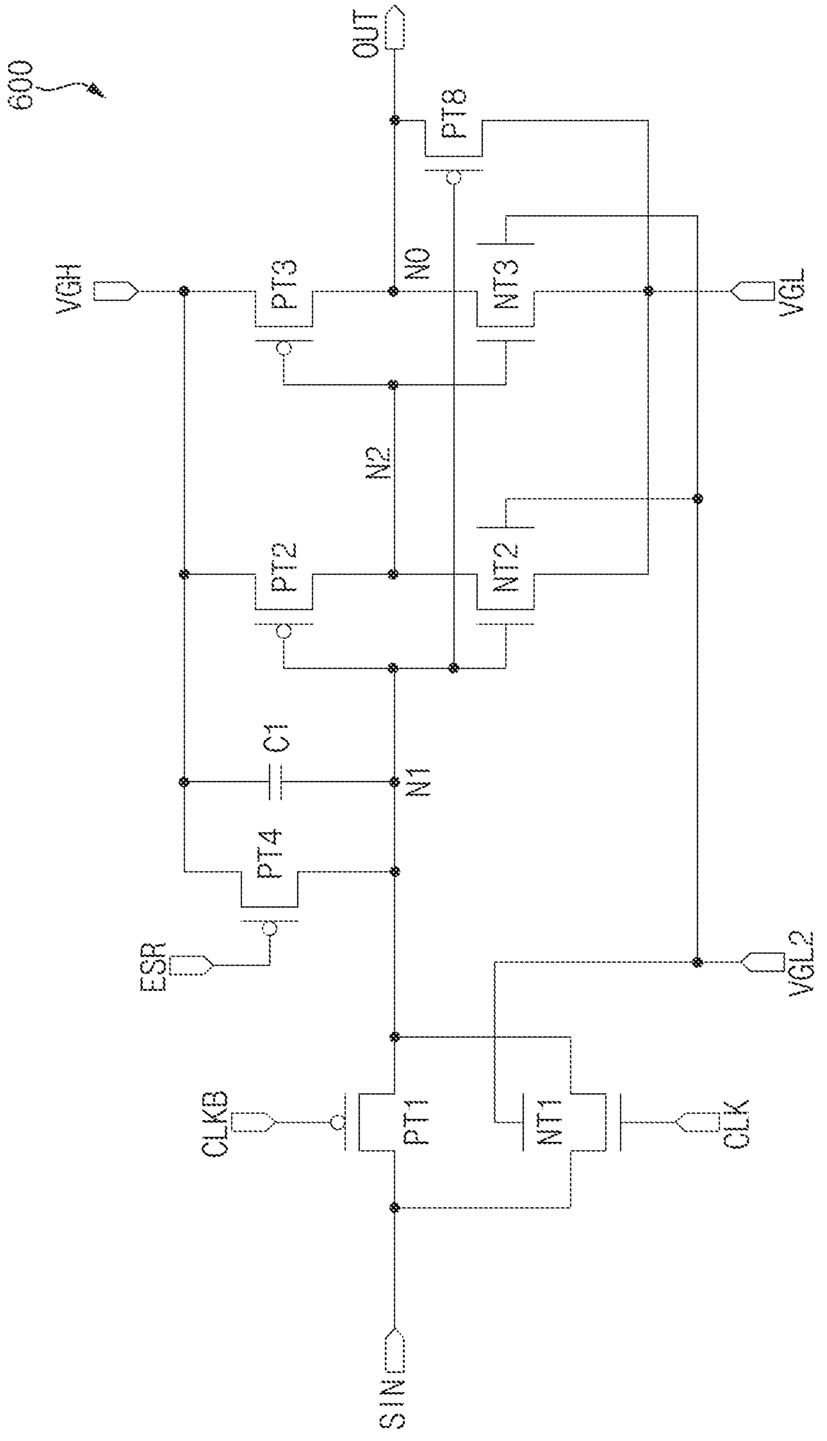
FIG. 11 is a circuit diagram illustrating an embodiment of a stage of a driver.

FIG. 11 is a circuit diagram illustrating an embodiment of a stage of a driver.

Referring to FIG. 11, a stage 600 of a driver in embodiments may include a first PMOS transistor PT1, a second PMOS transistor PT2, a third PMOS transistor PT3, a fourth PMOS transistor PT4, a first NMOS transistor NT1, a second NMOS transistor NT2, a third NMOS transistor NT3, a first capacitor C1 and an eighth PMOS transistor PT8. The stage 600 of FIG. 11 may have substantially the same configuration and operation as a stage 200 of FIG. 5, except that the stage 600 may further include the eighth PMOS transistor PT8.

The eighth PMOS transistor PT8 may transfer a relatively low gate voltage VGL to an output node NO in response to a voltage of a first node N1. Thus, the eighth PMOS transistor PT8 may be turned on when the third NMOS transistor NT3 is turned on, and may serve as a pull-down transistor for pulling down an output signal OUT to the relatively low gate voltage VGL along with the third NMOS transistor NT3. Accordingly, in the stage 600, the output signal OUT may rapidly fall from the relatively high gate voltage VGH to the relatively low gate voltage VGL, or may have a sharp falling edge. In some embodiments, the eighth PMOS transistor PT8 may include a gate connected to the first node N1, a first terminal connected to an output node NO at which the output signal OUT is output, and a second terminal connected to a line transferring the relatively low gate voltage VGL.

Figure 12:
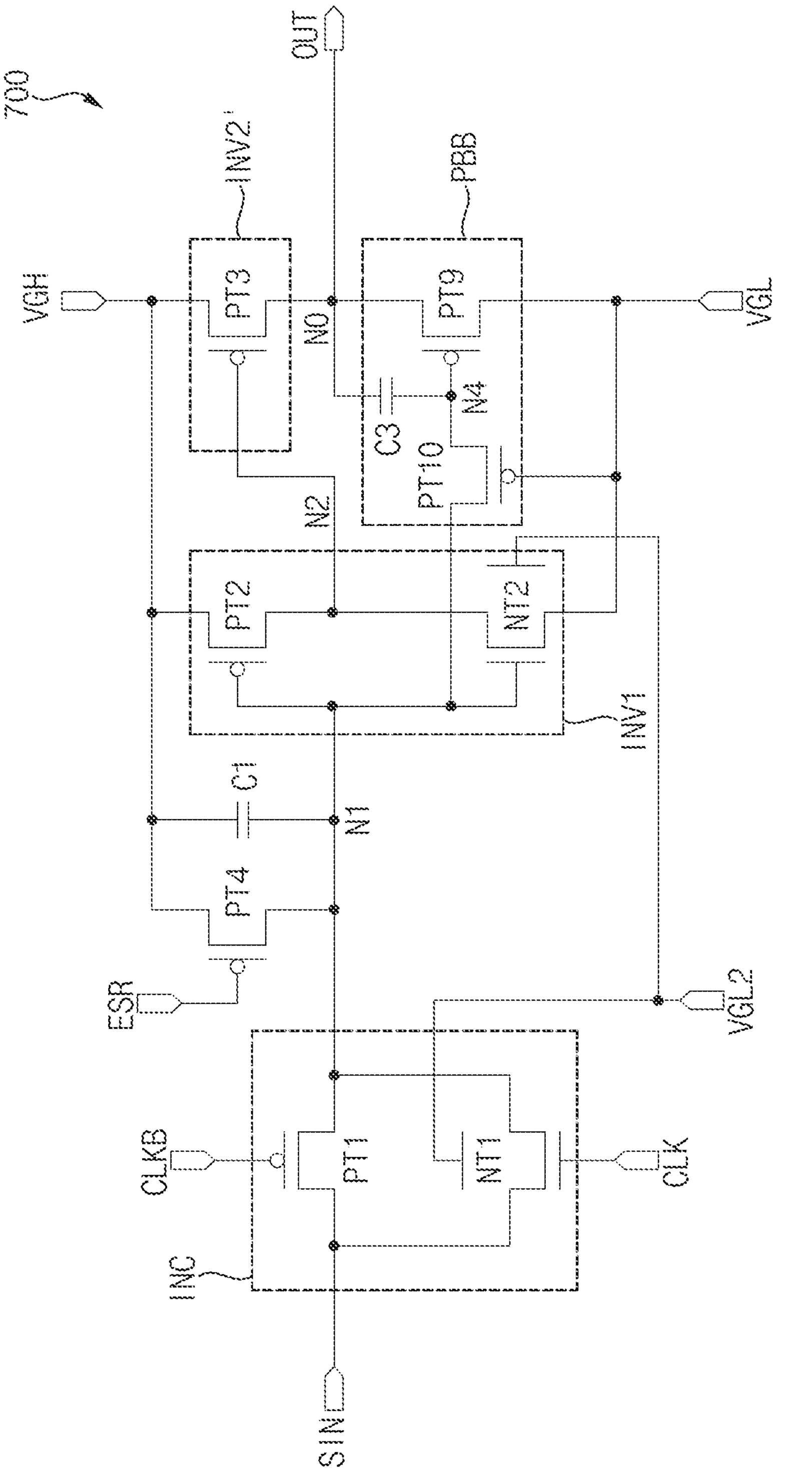
FIG. 12 is a circuit diagram illustrating an embodiment of a stage of a driver.
Figure 13:
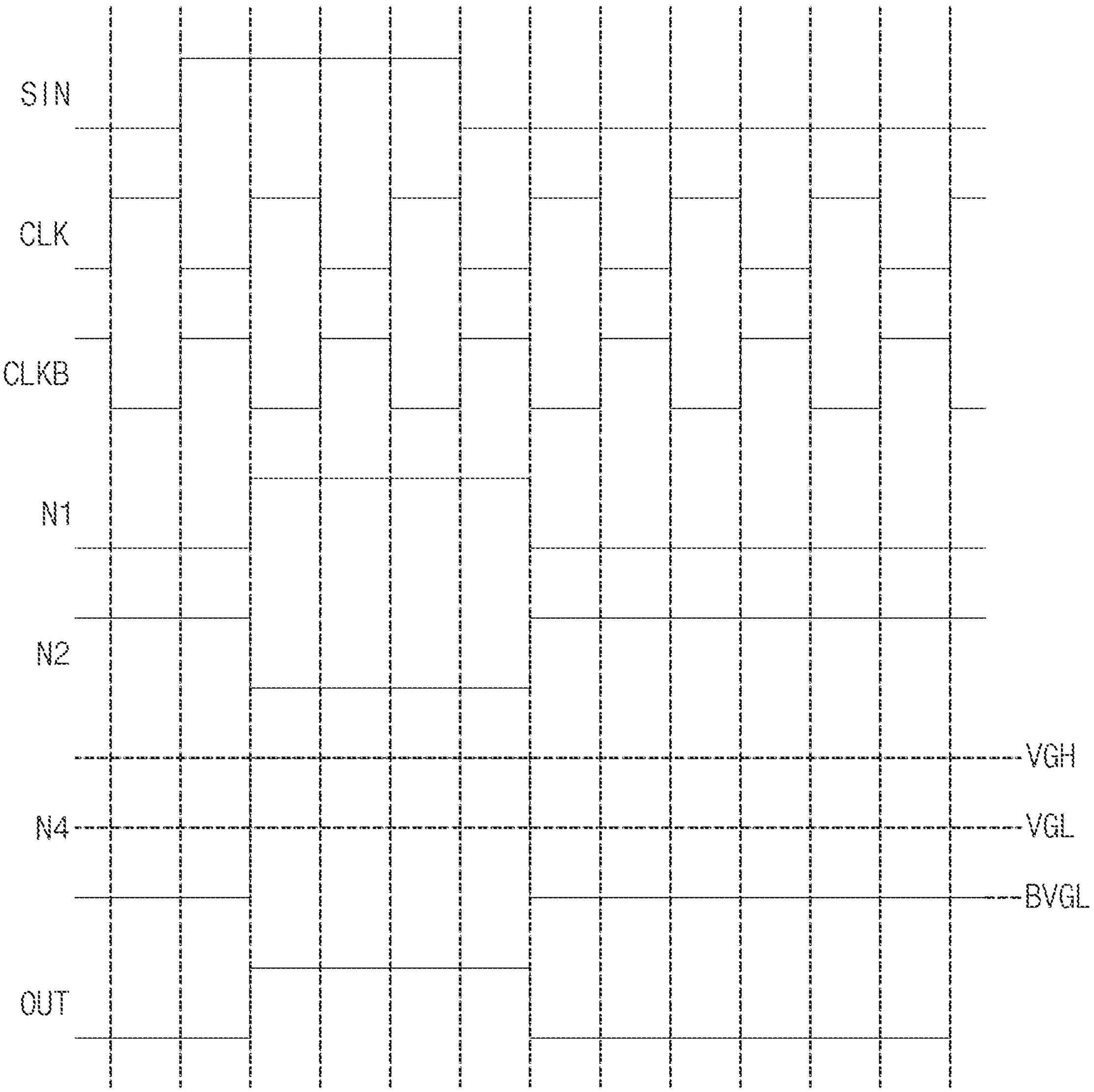
FIG. 13 is a timing diagram for describing an embodiment of an operation of a stage of FIG. 12.

FIG. 12 is a circuit diagram illustrating an embodiment of a stage of a driver, and FIG. 13 is a timing diagram for describing an embodiment of an operation of a stage of FIG. 12.

Referring to FIG. 12, a stage 700 of a driver in embodiments may include an input circuit INC, a first inverter INV1, a second inverter INV2', a fourth PMOS transistor PT4, a first capacitor C1 and a PMOS boosting buffer PBB. The stage 700 of FIG. 12 may have substantially the same configuration and operation as a stage 200 of FIG. 5, except that the second inverter INV2' is implemented as a PMOS inverter having only a third PMOS transistor PT3, and that the stage 700 may further include the PMOS boosting buffer PBB.

When a voltage of a second node N2 has a relatively low level, the second inverter INV2' may output a relatively high gate voltage VGH as an output signal OUT. Further, when the voltage of the second node N2 has a relatively high level, or when a voltage of a first node N1 has the relatively low level, the PMOS boosting buffer PBB may output a relatively low gate voltage VGL as the output signal OUT. In some embodiments, the PMOS boosting buffer PBB may include a third capacitor C3, a ninth PMOS transistor PT9 and a tenth PMOS transistor PT10. The third capacitor C3 may include a first electrode connected to an output node NO at which the output signal OUT is output, and a second electrode connected to a fourth node N4. The ninth PMOS transistor PT9 may include a gate connected to the fourth node N4, a first terminal connected to the output node NO, and a second terminal connected to a line transferring the relatively low gate voltage VGL. The tenth PMOS transistor PT10 may include a gate connected to the line transferring the relatively low gate voltage VGL, a first terminal connected to the first node N1, and a second terminal connected to the fourth node N4.

Referring to FIGS. 12 and 13, when the voltage of the first node N1 has a relatively high level and the voltage of the second node N2 has a relatively low level, the third PMOS transistor PT3 of the second inverter INV2' may be turned on, and the third PMOS transistor PT3 may transfer the relatively high gate voltage VGH to the output node NO. While the voltage of the first node N1 has the relatively high level, the tenth PMOS transistor PT10 may transfer the voltage of the first node N1 having the relatively high level to the fourth node N4, and the voltage of the fourth node N4 may have the relatively high level. Thereafter, when the voltage of the first node N1 is changed to a relatively low level, the tenth PMOS transistor PT10 may transfer the voltage of the first node N1 having the relatively low level to the fourth node N4, and the voltage of the fourth node N4 may have the relatively low level. When the voltage of the fourth node N4 has the relatively low level, the ninth PMOS transistor PT9 may transfer the relatively low gate voltage VGL to the output node NO, and the voltage of the output node NO may be decreased from the relatively high gate voltage VGH to the relatively low gate voltage VGL. When the voltage of the output node NO connected to the first electrode of the third capacitor C3 is decreased, the voltage of the fourth node N4 connected to the second electrode of the third capacitor C3 also may be further decreased. An operation in which the voltage of the fourth node N4 is decreased to a boosted low gate voltage BVGL lower than the relatively low gate voltage VGL of the output node NO may be also referred to as a boosting operation. In other words, while the output node NO has the relatively low gate voltage VGL, the voltage of the fourth node N4 may become a boosted low gate voltage BVGL is lower than the relatively low gate voltage VGL. Since the fourth node N4 has the boosted low gate voltage BVGL, the ninth PMOS transistor PT9 may be fully turned on, and the relatively low gate voltage VGL may be stably output as the output signal OUT at the output node NO.

Figure 14:
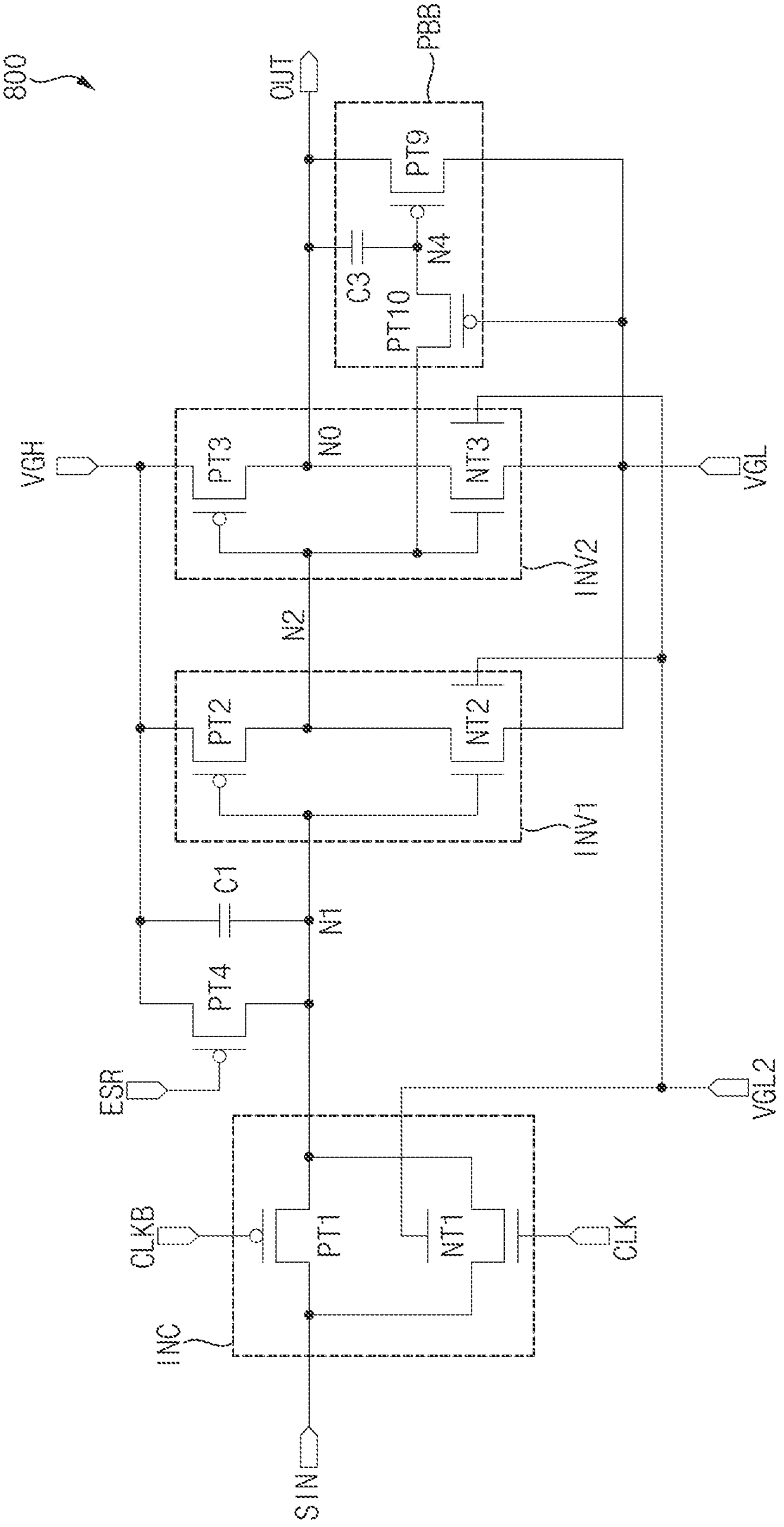
FIG. 14 is a circuit diagram illustrating an embodiment of a stage of a driver.

FIG. 14 is a circuit diagram illustrating an embodiment of a stage of a driver.

Referring to FIG. 14, a stage 800 of a driver in embodiments may include an input circuit INC, a first inverter INV1, a second inverter INV2, a fourth PMOS transistor PT4, a first capacitor C1 and a PMOS boosting buffer PBB. The stage 800 of FIG. 14 may have substantially the same configuration and operation as a stage 200 of FIG. 5, except that the stage 800 may further include the PMOS boosting buffer PBB. Further, unlike a stage 700 of FIG. 12 that includes only the PMOS boosting buffer PBB to output a relatively low gate voltage VGL as an output signal OUT, the stage 800 of FIG. 14 may include a third NMOS transistor NT3 and the PMOS boosting buffer PBB to output the relatively low gate voltage VGL as the output signal OUT.

A period in which the relatively low gate voltage VGL is output as the output signal OUT may be increased when a display device performs a relatively low frequency driving operation. In the stage 700 of FIG. 12 including only the PMOS boosting buffer PBB, a voltage of a fourth node N4 may be undesirably increased by a leakage current during the period, and thus a voltage of the output signal OUT may be undesirably increased during the period. However, in the stage 800 of FIG. 14, since not only the PMOS boosting buffer PBB but also the third NMOS transistor NT3 outputs the relatively low gate voltage VGL as the output signal OUT, even when the relatively low frequency driving operation is performed, the voltage of the output signal OUT may be substantially constant during the period.

Figure 15:
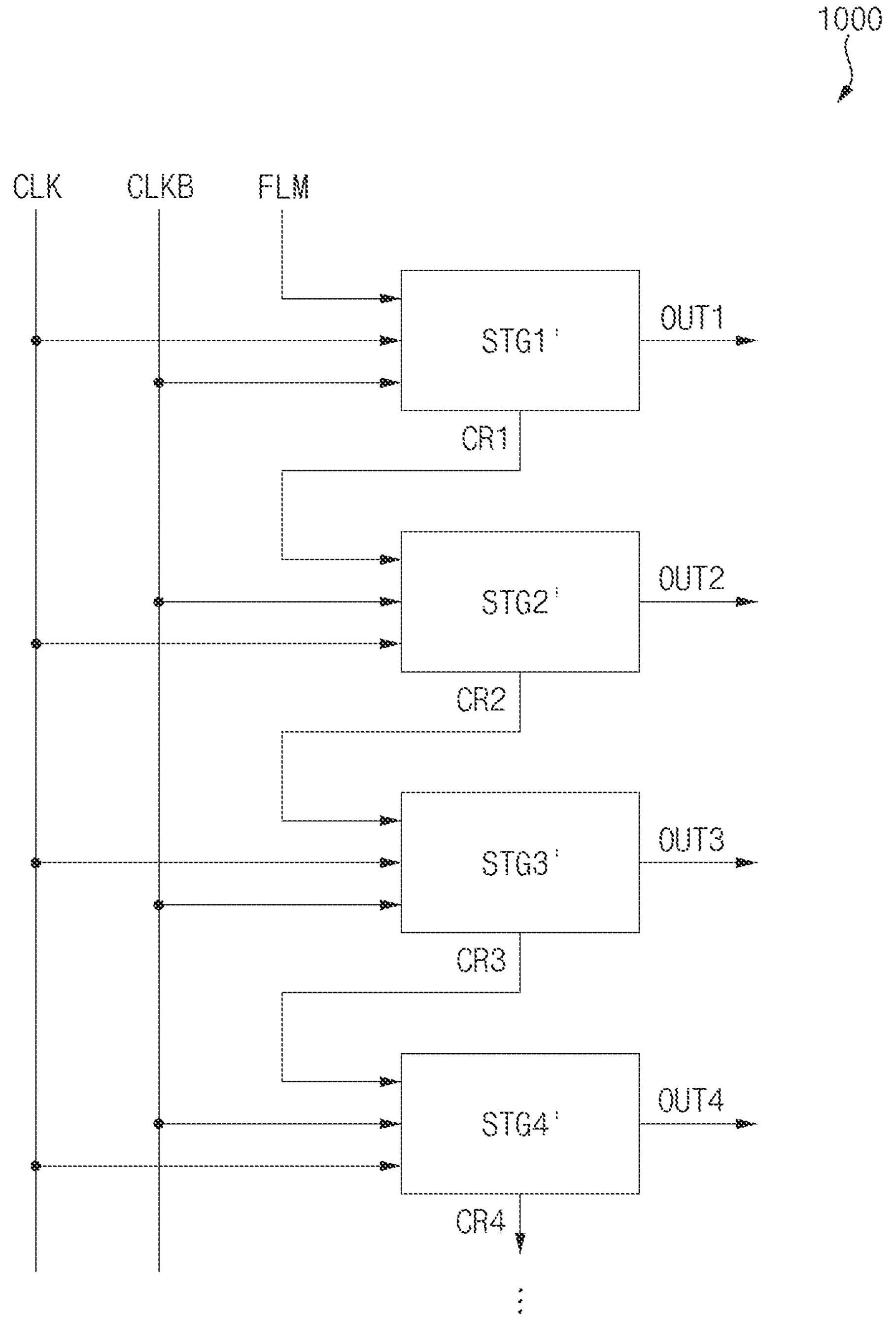
FIG. 15 is a block diagram illustrating an embodiment of a driver.
Figure 16:
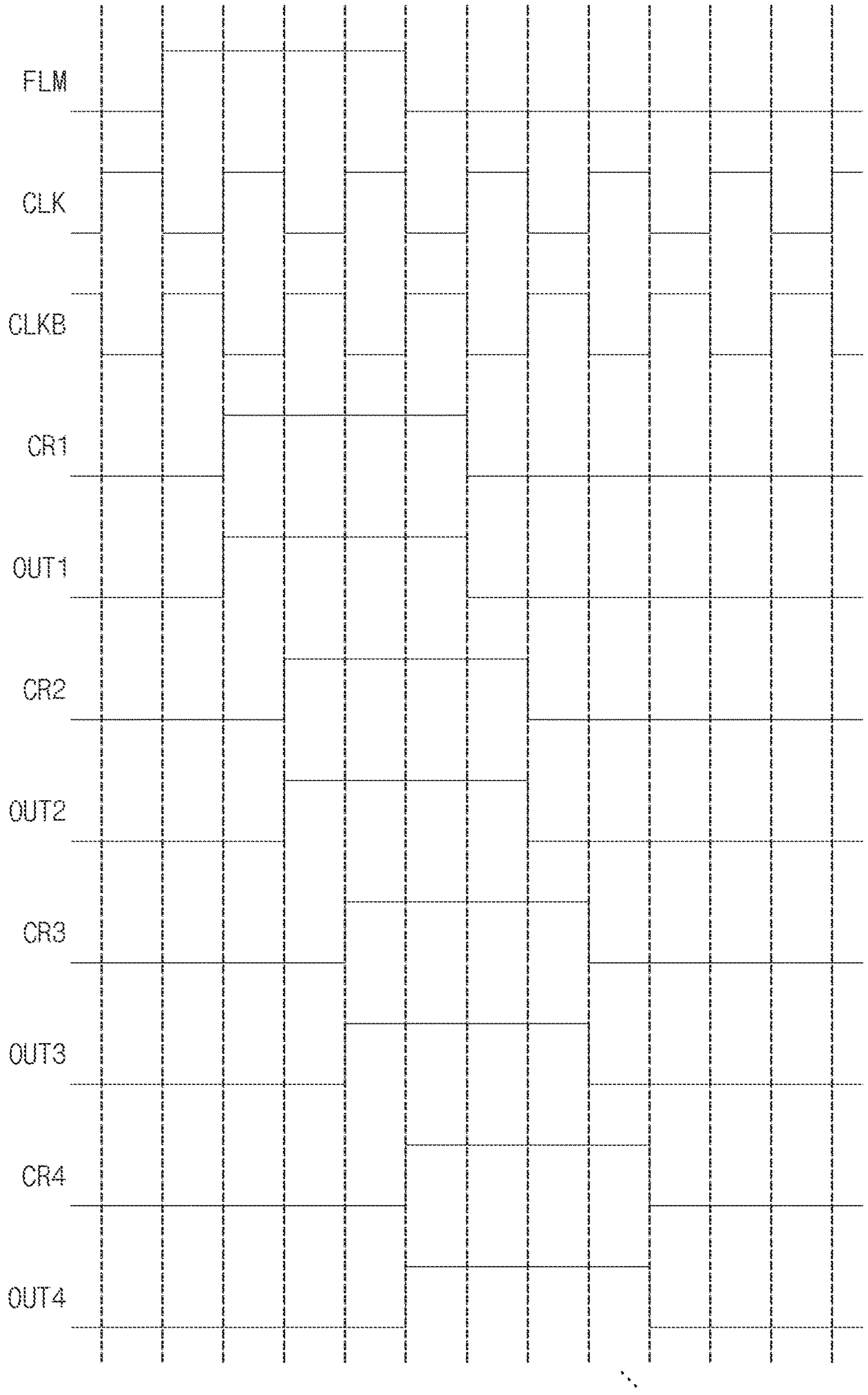
FIG. 16 is a timing diagram for describing an operation of a driver of FIG. 15.

FIG. 15 is a block diagram illustrating an embodiment of a driver, and FIG. 16 is a timing diagram for describing an operation of a driver of FIG. 15.

Referring to FIG. 15, a driver 1000 in embodiments may include a plurality of stages STG1', STG2', STG3', STG4', etc.

In the driver 1000 of FIG. 15, unlike a driver 100 of FIG. 1 in which each stage receives an output signal of a previous stage as an input signal, each stage may receive a carry signal of a previous stage as an input signal. In an embodiment, a second stage STG2' may receive a first carry signal CR1 of a first stage STG1' as the input signal, a third stage STG3' may receive a second carry signal CR2 of the second stage STG2' as the input signal, and a fourth stage STG4' may receive a third carry signal CR3 of the third stage STG3' as the input signal, for example.

Further, in some embodiments, each odd-numbered stage STG1', STG3', etc., may start outputting a carry signal CR1, CR3, . . . and an output signal OUT1, OUT3, etc., when a clock signal CLK has a relatively high level, and each even-numbered stage STG2', STG4', etc., may start outputting a carry signal CR2, CR4, . . . and an output signal OUT2, OUT4, etc., when an inverted clock signal CLKB has the relatively high level. In an embodiment, as illustrated in FIGS. 15 and 16, when the clock signal CLK becomes the relatively high level after the start signal FLM becomes the relatively high level, the first stage STG1' may start outputting the first carry signal CR1 having the relatively high level and a first output signal OUT1 having the relatively high level, for example. Further, when the clock signal CLK becomes the relatively high level after the start signal FLM becomes a relatively low level, the first stage STG1' may start outputting the first carry signal CR1 having the relatively low level and the first output signal OUT1 having the relatively low level. When the inverted clock signal CLKB becomes the relatively high level after the first carry signal CR1 becomes the relatively high level, the second stage STG2' may start outputting the second carry signal CR2 having the relatively high level and a second output signal OUT2 having the relatively high level. Further, when the inverted clock signal CLKB becomes the relatively high level after the first carry signal CR1 becomes the relatively low level, the second stage STG2' may start outputting the second carry signal CR2 having the relatively low level and the second output signal OUT2 having the relatively low level. When the clock signal CLK becomes the relatively high level after the second carry signal CR2 becomes the relatively high level, the third stage STG3' may start outputting the third carry signal CR3 having the relatively high level and a third output signal OUT3 having the relatively high level. Further, when the clock signal CLK becomes the relatively high level after the second carry signal CR2 becomes the relatively low level, the third stage STG3' may start outputting the third carry signal CR3 having the relatively low level and the third output signal OUT3 having the relatively low level. When the inverted clock signal CLKB becomes the relatively high level after the third carry signal CR3 becomes the relatively high level, the fourth stage STG4' may start outputting a fourth carry signal CR4 having the relatively high level and a fourth output signal OUT4 having the relatively high level. Further, when the inverted clock signal CLKB becomes the relatively high level after the third carry signal CR3 becomes the relatively low level, the fourth stage STG4' may start outputting the fourth carry signal CR4 having the relatively low level and the fourth output signal OUT4 having the relatively low level. In this manner, the plurality of stages STG1', STG2', STG3', STG4', etc., may sequentially output the carry signals CR1, CR2, CR3, CR4, . . . and the output signals OUT1, OUT2, OUT3, OUT4, etc., by delaying or shifting the carry signals CR1, CR2, CR3, CR4, . . . and the output signals OUT1, OUT2, OUT3, OUT4, etc., by half a period of the clock signal CLK.

Figure 17:
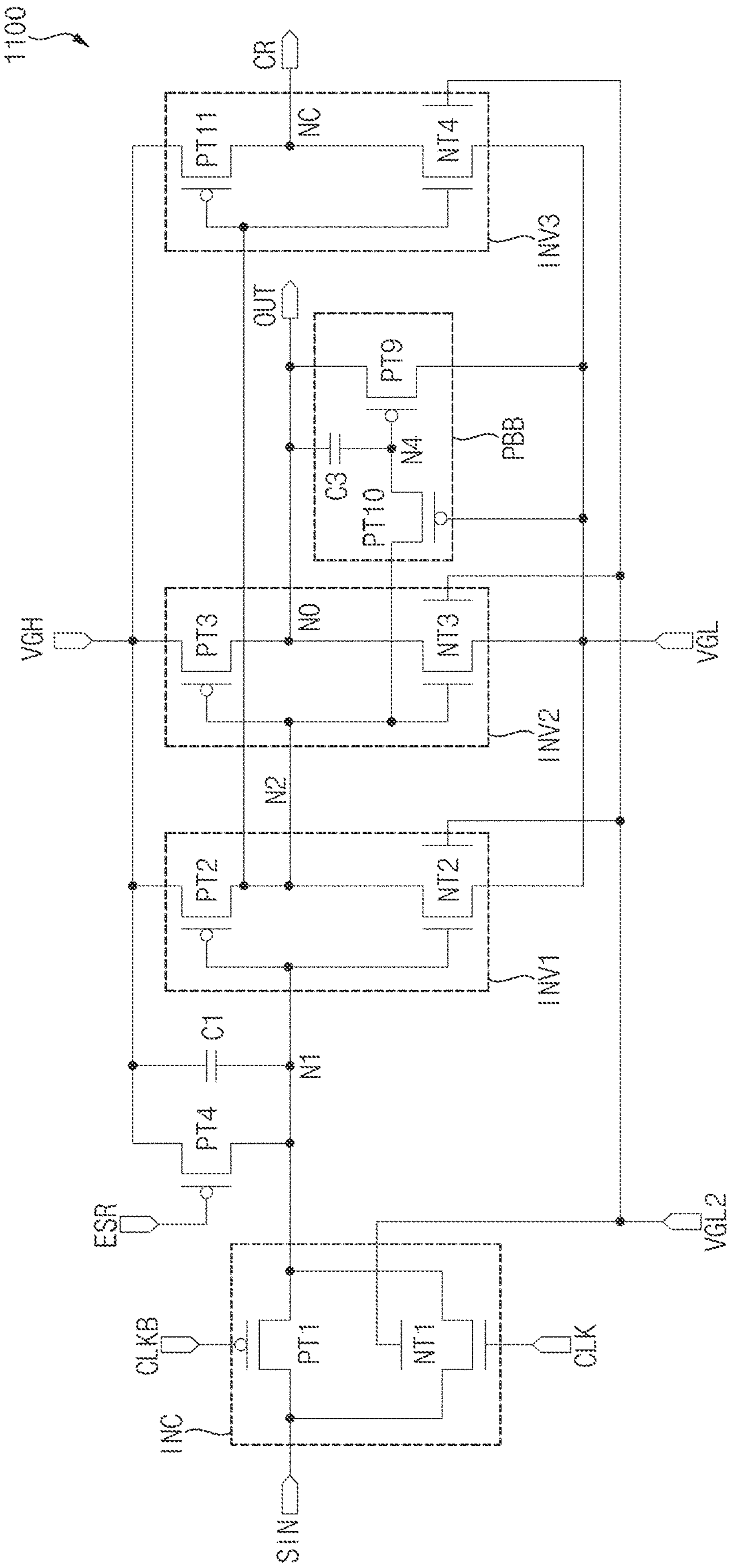
FIG. 17 is a circuit diagram illustrating an embodiment of a stage of a driver.

FIG. 17 is a circuit diagram illustrating an embodiment of a stage of a driver.

Referring to FIG. 17, a stage 1100 of a driver in embodiments may include an input circuit INC, a first inverter INV1, a second inverter INV2, a third inverter INV3, a fourth PMOS transistor PT4, a first capacitor C1 and a PMOS boosting buffer PBB. The stage 1100 of FIG. 17 may have substantially the same configuration and operation as a stage 800 of FIG. 14, except that the stage 1100 may further include the third inverter INV3 for outputting a carry signal CR.

The third inverter INV3 may generate the carry signal CR by inverting a voltage of a second node N2, and may be implemented as a CMOS inverter including an eleventh PMOS transistor PT11 and a fourth NMOS transistor NT4. In some embodiments, the eleventh PMOS transistor PT11 may include a gate connected to the second node N2, a first terminal connected to a line transferring a relatively high gate voltage VGH, and a second terminal connected to a carry node NC at which the carry signal CR is output, and the fourth NMOS transistor NT4 may include a gate connected to the second node N2, a first terminal connected to a line transferring a relatively low gate voltage VGL, and a second terminal connected to the carry node NC.

An output node NO at which an output signal OUT is output may have a relatively large load since the output node NO is connected to a line that is connected to pixels of a display panel, but the carry node NC at which the carry signal CR is output may have a relatively small load since the carry node NC is not connected to the line connected to the pixels of the display panel and is connected only to a next stage. Accordingly, in the stage 1100 where the output node NO and the carry node NC are separated from each other, even when the output signal OUT does not rapidly rise and fall, the carry signal CR may rapidly and sharply rise and fall.

Figure 18:
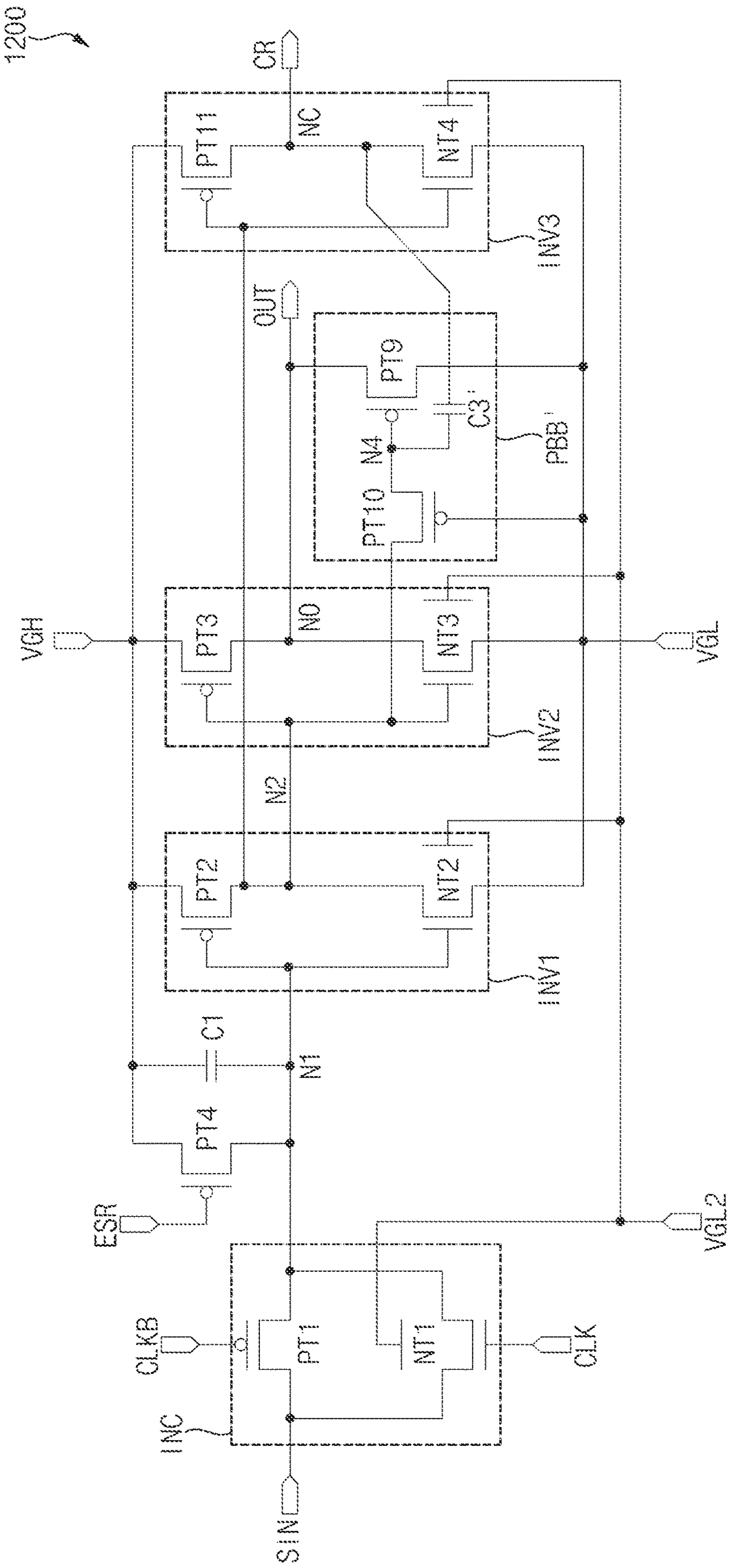
FIG. 18 is a circuit diagram illustrating an embodiment of a stage of a driver.

FIG. 18 is a circuit diagram illustrating an embodiment of a stage of a driver.

Referring to FIG. 18, a stage 1200 of a driver in embodiments may include an input circuit INC, a first inverter INV1, a second inverter INV2, a third inverter INV3, a fourth PMOS transistor PT4, a first capacitor C1 and a PMOS boosting buffer PBB'. The stage 1200 of FIG. 18 may have substantially the same configuration and operation as a stage 1100 of FIG. 17, except that a third capacitor C3' of the PMOS boosting buffer PBB' is connected to a carry node NC instead of an output node NO.

The third capacitor C3' of the PMOS boosting buffer PBB' may be connected between a fourth node N4 and the carry node NC. That is, the third capacitor C3' may include a first electrode connected to the carry node NC at which a carry signal CR is output, and a second electrode connected to the fourth node N4. Since the carry node NC has a relatively small load compared with the output node NO, a boosting operation for the fourth node N3 by the third capacitor C3' may be relatively rapidly performed.

Figure 19:
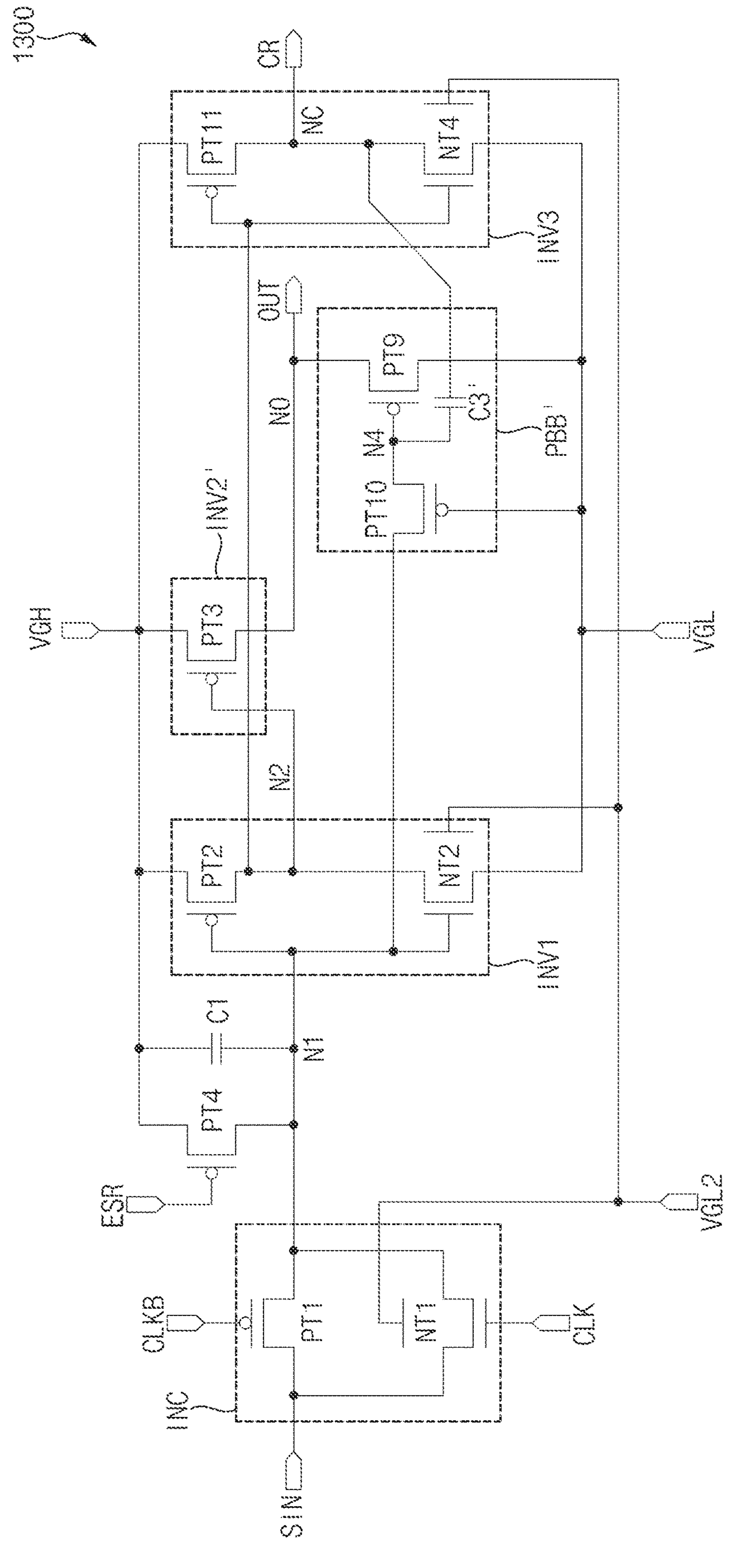
FIG. 19 is a circuit diagram illustrating an embodiment of a stage of a driver.

FIG. 19 is a circuit diagram illustrating an embodiment of a stage of a driver.

Referring to FIG. 19, a stage 1300 of a driver in embodiments may include an input circuit INC, a first inverter INV1, a second inverter INV2', a third inverter INV3, a fourth PMOS transistor PT4, a first capacitor C1 and a PMOS boosting buffer PBB'. The stage 1300 of FIG. 19 may have substantially the same configuration and operation as a stage 1200 of FIG. 18, except that the second inverter INV2' may be implemented as a PMOS inverter having only a third PMOS transistor PT3. In the stage 1300, an output signal OUT having a relatively high gate voltage VGH may be generated by the second inverter INV2', and the output signal OUT having a relatively low gate voltage VGL may be generated by the PMOS boosting buffer PBB'.

Figure 20:
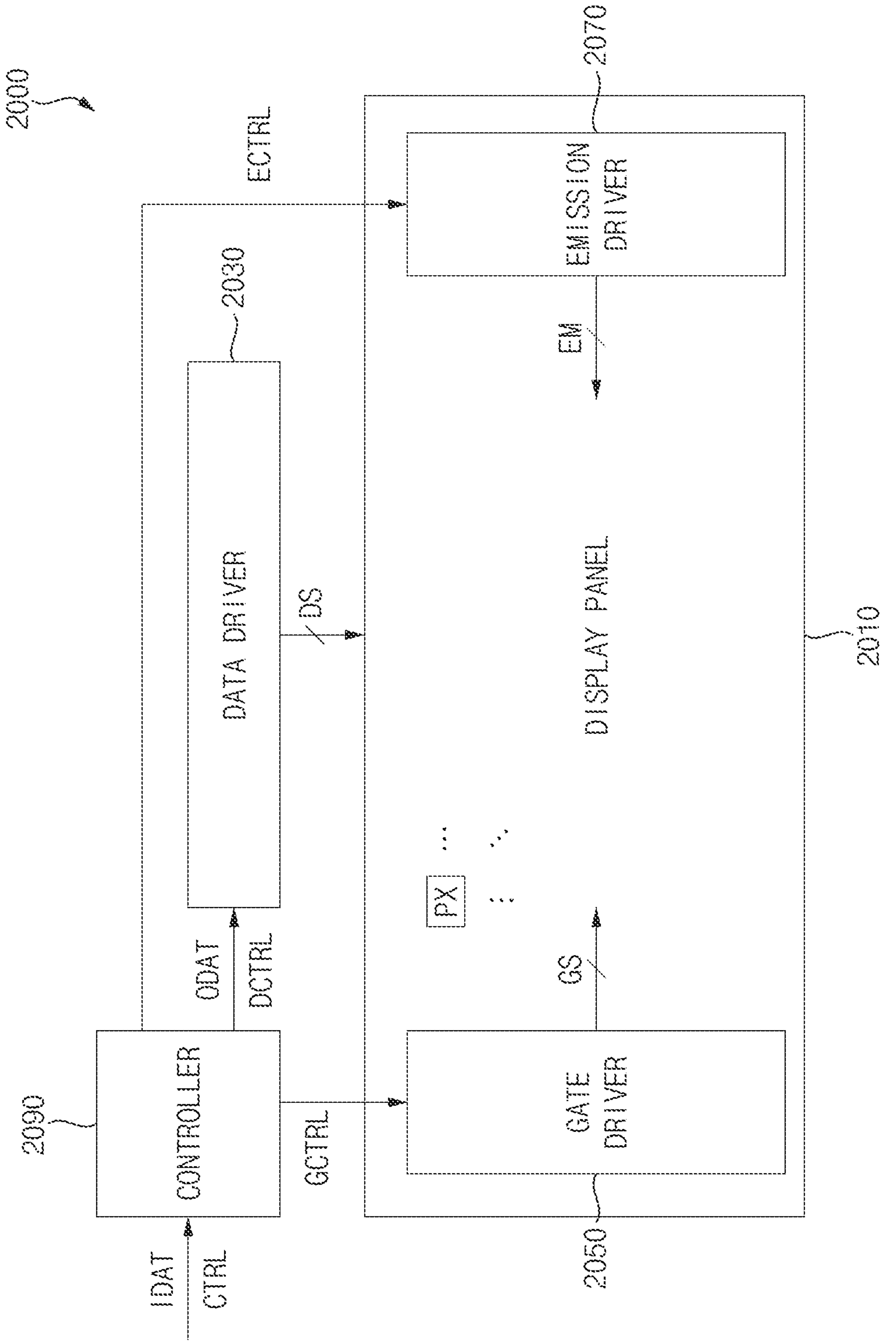
FIG. 20 is a block diagram illustrating an embodiment of a display device.

FIG. 20 is a block diagram illustrating an embodiment of a display device.

Referring to FIG. 20, a display device 2000 in embodiments may include a display panel 2010 that includes a plurality of pixels PX, a data driver 2030 that provides data signals DS to the plurality of pixels PX, a gate driver 2050 that provides gate signals GS to the plurality of pixels PX, an emission driver 2070 that provides emission signals EM to the plurality of pixels PX, and a controller 2090 that controls the data driver 2030, the gate driver 2050 and the emission driver 2070.

The display panel 2010 may include data lines, gate lines, emission lines, and the plurality of pixels PX connected thereto. In some embodiments, each pixel PX may include a light-emitting element, and the display panel 2010 may be a light-emitting display panel. In some embodiments, the light-emitting element may be an organic light-emitting diode ("OLED"). In other embodiments, the light-emitting element may be a nano light-emitting diode ("NED"), a quantum dot ("QD") light-emitting diode, a micro light-emitting diode, an inorganic light-emitting diode, or any other suitable light-emitting element. In other embodiments, the display panel 2010 may be a liquid crystal display ("LCD") panel, or any other suitable display panel.

The data driver 2030 may generate the data signals DS based on a data control signal DCTRL and output image data ODAT received from the controller 2090, and may provide the data signals DS to the plurality of pixels PX through the data lines. In some embodiments, the data control signal DCTRL may include, but is not limited to, an output data enable signal, a horizontal start signal, and a load signal. In some embodiments, the data driver 2030 and the controller 2090 may be implemented as a single integrated circuit, and the single integrated circuit may be referred to as a timing controller embedded data driver ("TED") integrated circuit. In other embodiments, the data driver 2030 and the controller 2090 may be implemented as separate integrated circuits.

The gate driver 2050 may generate the gate signals GS based on a gate control signals GCTRL received from the controller 2090, and may sequentially provide the gate signals GS to the plurality of pixels PX through the gate lines on a row-by-row basis. In some embodiments, the gate control signal GCTRL may include, but is not limited to, a gate start signal and a gate clock signal. In some embodiments, the gate driver 2050 may be a driver 100 of FIG. 1 including a stage 200 of FIG. 5, a stage 300 of FIG. 7, a stage 400 of FIG. 8, a stage 500 of FIG. 9, a stage 600 of FIG. 11, a stage 700 of FIG. 12 or a stage 800 of FIG. 14, or may be a driver 1000 of FIG. 15 including a stage 1100 of FIG. 17, a stage 1200 of FIG. 18 or a stage 1300 of FIG. 19. Further, in some embodiments, as illustrated in FIG. 20, the gate driver 2050 may be integrated or formed in the display panel 2010. In other embodiments, the gate driver 2050 may be implemented as one or more integrated circuits.

The emission driver 2070 may generate the emission signals EM based on an emission control signal ECTRL received from the controller 2090, and may sequentially provide the emission signals EM to the plurality of pixels PX through the emission lines on a row-by-row basis. In some embodiments, the emission control signal ECTRL may include, but is not limited to, an emission start signal and an emission clock signal. In some embodiments, the emission driver 2070 may have be the driver 100 of FIG. 1 including the stage 200 of FIG. 5, the stage 300 of FIG. 7, the stage 400 of FIG. 8, the stage 500 of FIG. 9, the stage 600 of FIG. 11, the stage 700 of FIG. 12 or the stage 800 of FIG. 14, or may be a driver 1000 of FIG. 15 including the stage 1100 of FIG. 17, the stage 1200 of FIG. 18 or the stage 1300 of FIG. 19. Further, in some embodiments, as illustrated in FIG. 20, the emission driver 2070 may be integrated or formed in the display panel 2010. In other embodiments, the emission driver 2070 may be implemented as one or more integrated circuits.

The controller 2090 (e.g., a timing controller ("TCON")) may receive input image data IDAT and a control signal CTRL from an external host processor (e.g., a graphics processing unit ("GPU"), an application processor ("AP") or a graphics card). In some embodiments, the input image data IDAT may be RGB image data including red image data, green image data and blue image data. In some embodiments, the control signal CTRL may include, but is not limited to, a vertical synchronization signal, a horizontal synchronization signal, an input data enable signal, a master clock signal, etc. The controller 2090 may generate the output image data ODAT, the data control signal DCTRL, the gate control signal GCTRL and the emission control signal ECTRL based on the input image data IDAT and the control signal CTRL. The controller 2090 may control an operation of the data driver 2030 by providing the output image data ODAT and the data control signal DCTRL to the data driver 2030, may control an operation of the gate driver 2050 by providing the gate control signal GCTRL to the gate driver 2050, and may control an operation of the emission driver 2070 by providing the emission control signal ECTRL to the emission driver 2070.

In the display device 2000 in embodiments, at least one driver of the gate driver 2050 and the emission driver 2070 may be implemented as the driver 100 of FIG. 1 or the driver 1000 of FIG. 15. At least one stage of the driver may include both of a PMOS transistor and an NMOS transistor, and an active region of the PMOS transistor may include or consist of materials different from materials of an active region of the NMOS transistor. Accordingly, a bootstrapping operation may not be desired in the stage, and power consumption of the driver and the display device 2000 may be reduced.

Figure 21:
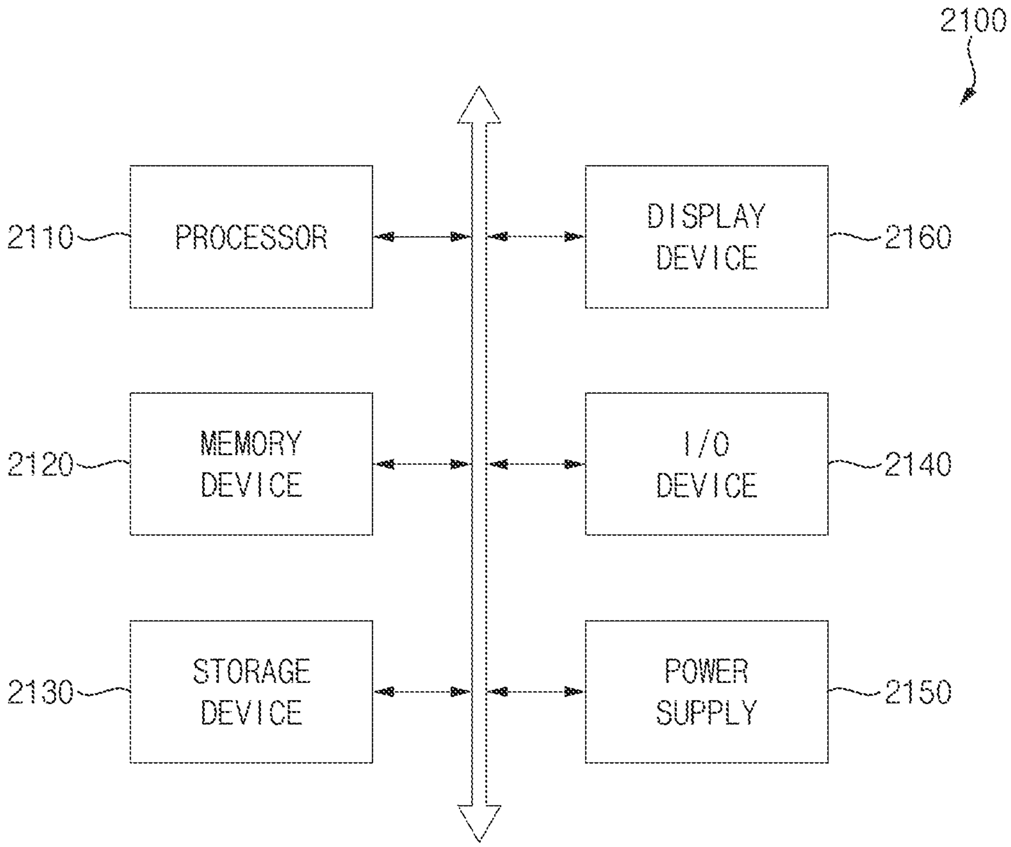
FIG. 21 is a block diagram illustrating an embodiment of an electronic device including a display device.

FIG. 21 is a block diagram illustrating an embodiment of an electronic device including a display device.

Referring to FIG. 21, an electronic device 2100 may include a processor 2110, a memory device 2120, a storage device 2130, an input/output ("I/O") device 2140, a power supply 2150, and a display device 2160. The electronic device 2100 may further include a plurality of ports for communicating a video card, a sound card, a memory card, a universal serial bus ("USB") device, other electric devices, etc.

The processor 2110 may perform various computing functions or tasks. The processor 2110 may be an application processor ("AP"), a micro processor, a central processing unit ("CPU"), etc. The processor 2110 may be connected to other components via an address bus, a control bus, a data bus, etc. Further, in some embodiments, the processor 2110 may be further connected to an extended bus such as a peripheral component interconnection ("PCI") bus.

The memory device 2120 may store data for operations of the electronic device 2100. In an embodiment, the memory device 2120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc., for example.

The storage device 2130 may be a solid state drive ("SSD") device, a hard disk drive ("HDD") device, a compact disc read-only memory ("CD-ROM") device, etc. The I/O device 2140 may be an input device such as a keyboard, a keypad, a mouse, a touch screen, etc., and an output device such as a printer, a speaker, etc. The power supply 2150 may supply power for operations of the electronic device 2100. The display device 2160 may be connected to other components through the buses or other communication links.

In the display device 2160, at least one stage may include both of a PMOS transistor and an NMOS transistor, and an active region of the PMOS transistor may include or consist of materials different from materials of an active region of the NMOS transistor. Accordingly, a bootstrapping operation may not be desired in the stage, and power consumption of the driver and the display device 2160 may be reduced.

The inventive concepts may be applied to any display device 2160 supporting the variable frame mode, and any electronic device 2100 including the display device 2160. In an embodiment, the inventive concepts may be applied to a smart phone, a wearable electronic device, a tablet computer, a mobile phone, a television ("TV"), a digital TV, a three dimensional ("3D") TV, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of embodiments and is not to be construed as limiting thereof. AL-though a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A driver disposed in a display panel, the driver including:

a plurality of stages, at least one stage of the plurality of stages comprising:

an input circuit which transfers an input signal to a first node in response to at least one of a clock signal and an inverted clock signal; and inverters which generate an output signal based on a voltage of the first node, at least one of the inverters including:

a p-type metal-oxide-semiconductor transistor including a first active region; and an n-type metal-oxide-semiconductor transistor including a second active region, wherein the p-type metal-oxide-semiconductor transistor and the n-type metal-oxide-semiconductor transistor are connected in series between a line transferring a relatively high gate voltage and a line transferring a relatively low gate voltage, and the first active region of the p-type metal-oxide-semiconductor transistor includes a material different from a material of the second active region of the n-type metal-oxide-semiconductor transistor.

2. The driver of claim 1, wherein the first active region of the p-type metal-oxide-semiconductor transistor includes polycrystalline silicon, and wherein the second active region of the n-type metal-oxide-semiconductor transistor includes an oxide semiconductor.

3. The driver of claim 1, wherein the first active region of the p-type metal-oxide-semiconductor transistor includes polycrystalline silicon, and wherein the second active region of the n-type metal-oxide-semiconductor transistor includes an organic semiconductor.

4. The driver of claim 1, wherein the first active region of the p-type metal-oxide-semiconductor transistor includes polycrystalline silicon, and wherein the second active region of the n-type metal-oxide-semiconductor transistor includes amorphous silicon.

5. The driver of claim 1, wherein the first active region of the p-type metal-oxide-semiconductor transistor and the second active region of the n-type metal-oxide-semiconductor transistor are disposed in different layers, respectively, disposed at different heights, respectively, from a substrate of the display panel.

6. The driver of claim 1, wherein the n-type metal-oxide-semiconductor transistor includes a top gate disposed above the second active region, and a bottom gate disposed below the second active region.

7. The driver of claim 6, wherein a second relatively low gate voltage different from the relatively low gate voltage is applied to the bottom gate of the n-type metal-oxide-semiconductor transistor.

8. The driver of claim 7, wherein the second relatively low gate voltage is lower than the relatively low gate voltage.

9. The driver of claim 6, wherein the bottom gate of the n-type metal-oxide-semiconductor transistor is connected to the top gate of the n-type metal-oxide-semiconductor transistor.

10. The driver of claim 1, wherein the input circuit includes:

a first p-type metal-oxide-semiconductor transistor which transfers the input signal to the first node in response to the inverted clock signal.

11. The driver of claim 1, wherein the input circuit includes:

a first n-type metal-oxide-semiconductor transistor which transfers the input signal to the first node in response to the clock signal.

12. The driver of claim 1, wherein the input circuit includes:

a first p-type metal-oxide-semiconductor transistor which transfers the input signal to the first node in response to the inverted clock signal; and a first n-type metal-oxide-semiconductor transistor which transfers the input signal to the first node in response to the clock signal.

13. The driver of claim 12, wherein the first p-type metal-oxide-semiconductor transistor includes a gate receiving the inverted clock signal, a first terminal receiving the input signal, and a second terminal connected to the first node, and wherein the first n-type metal-oxide-semiconductor transistor includes a gate receiving the clock signal, a first terminal receiving the input signal, and a second terminal connected to the first node.

14. The driver of claim 1, wherein the at least one stage further comprises:

a first capacitor which holds the voltage of the first node.

15. The driver of claim 14, wherein the first capacitor includes a first electrode connected to the line transferring the relatively high gate voltage, and a second electrode connected to the first node.

16. The driver of claim 1, wherein the inverters include:

a first complementary metal-oxide-semiconductor inverter which provides an inverted voltage to a second node by inverting the voltage of the first node; and a second complementary metal-oxide-semiconductor inverter which generates the output signal by inverting a voltage of the second node.

17. The driver of claim 16, wherein the first complementary metal-oxide-semiconductor inverter includes:

a second p-type metal-oxide-semiconductor transistor including a gate connected to the first node, a first terminal connected to the line transferring the relatively high gate voltage, and a second terminal connected to the second node; and a second n-type metal-oxide-semiconductor transistor including a gate connected to the first node, a first terminal connected to the line transferring the relatively low gate voltage, and a second terminal connected to the second node, and wherein the second complementary metal-oxide-semiconductor inverter includes:

a third p-type metal-oxide-semiconductor transistor including a gate connected to the second node, a first terminal connected to the line transferring the relatively high gate voltage, and a second terminal connected to an output node at which the output signal is output; and a third n-type metal-oxide-semiconductor transistor including a gate connected to the second node, a first terminal connected to the line transferring the relatively low gate voltage, and a second terminal connected to the output node.

18. The driver of claim 1, wherein the at least one stage further comprises:

a fourth p-type metal-oxide-semiconductor transistor which transfers the relatively high gate voltage to the first node in response to a global reset signal.

19. The driver of claim 18, wherein the fourth p-type metal-oxide-semiconductor transistor includes a gate receiving the global reset signal, a first terminal connected to the line transferring the relatively high gate voltage, and a second terminal connected to the first node.

20. The driver of claim 1, wherein the n-type metal-oxide-semiconductor transistor includes a bottom gate, and wherein the at least one stage further comprises:

a charge pump circuit which generates a bottom gate voltage applied to the bottom gate based on the relatively low gate voltage and the clock signal.

21. The driver of claim 20, wherein the charge pump circuit includes:
a fifth p-type metal-oxide-semiconductor transistor including a gate connected to a third node, a first terminal connected to the bottom gate, and a second terminal connected to the third node;
a sixth p-type metal-oxide-semiconductor transistor including a gate connected to the line transferring the relatively low gate voltage, a first terminal connected to the third node, and a second terminal connected to the line transferring the relatively low gate voltage;
a second capacitor including a first electrode connected to the third node, and a second electrode; and
a seventh p-type metal-oxide-semiconductor transistor including a gate connected to the third node, a first terminal connected to the second electrode of the second capacitor, and a second terminal receiving the clock signal.

22. The driver of claim 1, wherein the inverters include:
a first complementary metal-oxide-semiconductor inverter which provides an inverted voltage to a second node by inverting the voltage of the first node; and
a second complementary metal-oxide-semiconductor inverter which generates the output signal by inverting a voltage of the second node, and
wherein the at least one stage further comprises:
an eighth p-type metal-oxide-semiconductor transistor including a gate connected to the first node, a first terminal connected to an output node at which the output signal is output, and a second terminal connected to the line transferring the relatively low gate voltage.

23. The driver of claim 1, wherein the inverters include:
a first complementary metal-oxide-semiconductor inverter which provides an inverted voltage to a second node by inverting the voltage of the first node; and
a p-type metal-oxide-semiconductor inverter which outputs the relatively high gate voltage as the output signal when a voltage of the second node has a relatively low level, and
wherein the at least one stage further comprises:
a p-type metal-oxide-semiconductor boosting buffer which outputs the relatively low gate voltage as the output signal when the voltage of the first node has a relatively low level.

24. The driver of claim 23, wherein the p-type metal-oxide-semiconductor boosting buffer includes:
a third capacitor including a first electrode connected to an output node at which the output signal is output, and a second electrode connected to a fourth node;
a ninth p-type metal-oxide-semiconductor transistor including a gate connected to the fourth node, a first terminal connected to the output node, and a second terminal connected to the line transferring the relatively low gate voltage; and
a tenth p-type metal-oxide-semiconductor transistor including a gate connected to the line transferring the relatively low gate voltage, a first terminal connected to the first node, and a second terminal connected to the fourth node.

25. The driver of claim 1, wherein the inverters include:
a first complementary metal-oxide-semiconductor inverter which provides an inverted voltage to a second node by inverting the voltage of the first node; and
a second complementary metal-oxide-semiconductor inverter which generates the output signal by inverting a voltage of the second node, and
wherein the at least one stage further comprises:
a p-type metal-oxide-semiconductor boosting buffer which outputs the relatively low gate voltage as the output signal when the voltage of the first node has a relatively low level.

26. The driver of claim 1, wherein the inverters include:
a first complementary metal-oxide-semiconductor inverter which provides an inverted voltage to a second node by inverting the voltage of the first node; and
a second complementary metal-oxide-semiconductor inverter which generates the output signal by inverting a voltage of the second node, and
wherein the at least one stage further comprises:
a third complementary metal-oxide-semiconductor inverter which generates a carry signal by inverting the voltage of the second node.

27. The driver of claim 26, wherein the third complementary metal-oxide-semiconductor inverter includes:
an eleventh p-type metal-oxide-semiconductor transistor including a gate connected to the second node, a first terminal connected to the line transferring the relatively high gate voltage, and a second terminal connected to a carry node at which the carry signal is output; and
a fourth n-type metal-oxide-semiconductor transistor including a gate connected to the second node, a first terminal connected to the line transferring the relatively low gate voltage, and a second terminal connected to the carry node.

28. The driver of claim 26, wherein the at least one stage further comprises:
a p-type metal-oxide-semiconductor boosting buffer which outputs the relatively low gate voltage as the output signal when the voltage of the first node has a relatively low level.

29. The driver of claim 28, wherein the p-type metal-oxide-semiconductor boosting buffer includes:
a third capacitor including a first electrode connected to a carry node at which the carry signal is output, and a second electrode connected to a fourth node;
a ninth p-type metal-oxide-semiconductor transistor including a gate connected to the fourth node, a first terminal connected to an output node at which the output signal is output, and a second terminal connected to the line transferring the relatively low gate voltage; and
a tenth p-type metal-oxide-semiconductor transistor including a gate connected to the line transferring the relatively low gate voltage, a first terminal connected to the first node, and a second terminal connected to the fourth node.

30. The driver of claim 1, wherein the inverters include:
a first complementary metal-oxide-semiconductor inverter which provides an inverted voltage to a second node by inverting the voltage of the first node; and
a p-type metal-oxide-semiconductor inverter which outputs the relatively high gate voltage as the output signal when a voltage of the second node has a relatively low level, and
wherein the at least one stage further comprises:
a p-type metal-oxide-semiconductor boosting buffer which outputs the relatively low gate voltage as the output signal when the voltage of the first node has a relatively low level; and
a third complementary metal-oxide-semiconductor inverter which generates a carry signal by inverting the voltage of the second node.

31. A driver disposed in a display panel, the driver including:

a plurality of stages, at least one stage of the plurality of stages comprising:

an input circuit which transfers an input signal to a first node in response to at least one of a clock signal and an inverted clock signal; and inverters which generate an output signal based on a voltage of the first node, at least one of the inverters includes:

a p-type metal-oxide-semiconductor transistor; and an n-type metal-oxide-semiconductor transistor including:

an active region;

a top gate disposed above the active region; and a bottom gate disposed below the active region, wherein the p-type metal-oxide-semiconductor transistor and the n-type metal-oxide-semiconductor transistor are connected in series between a line transferring a relatively high gate voltage and a line transferring a relatively low gate voltage.

32. The driver of claim 31, wherein a second relatively low gate voltage different from the relatively low gate voltage is applied to the bottom gate of the n-type metal-oxide-semiconductor transistor.

33. The driver of claim 31, wherein the bottom gate of the n-type metal-oxide-semiconductor transistor is connected to the top gate of the n-type metal-oxide-semiconductor transistor.

34. The driver of claim 31, wherein an active region of the p-type metal-oxide-semiconductor transistor includes a material different from a material of the active region of the n-type metal-oxide-semiconductor transistor.

35. A display device comprising:

a display panel including a plurality of pixels;

a data driver which provides data signals to the plurality of pixels;

a gate driver which provides gate signals to the plurality of pixels;

an emission driver which provides emission signals to the plurality of pixels; and a controller which controls the data driver, the gate driver and the emission driver, wherein at least one of the gate driver and the emission driver includes a plurality of stages, and wherein at least one stage of the plurality of stages comprising:

an input circuit which transfers an input signal to a first node in response to at least one of a clock signal and an inverted clock signal; and inverters which generate an output signal corresponding to one of the gate signals or one of the emission signals based on a voltage of the first node, wherein at least one of the inverters includes a p-type metal-oxide-semiconductor transistor and an n-type metal-oxide-semiconductor transistor connected in series between a line transferring a relatively high gate voltage and a line transferring a relatively low gate voltage, and wherein a first active region of the p-type metal-oxide-semiconductor transistor includes a material different from a material of a second active region of the n-type metal-oxide-semiconductor transistor.

* * * * *